(12) United States Patent
Nagase et al.

(10) Patent No.: US 7,643,118 B2
(45) Date of Patent: Jan. 5, 2010

(54) LIQUID CRYSTAL PANEL AND LIQUID CRYSTAL DISPLAY DEVICE

(75) Inventors: Junichi Nagase, Ibaraki (JP); Yutaka Ohmori, Ibaraki (JP); Takahisa Konishi, Ibaraki (JP); Toshiyuki Iida, Ibaraki (JP); Hisae Shimizu, Ibaraki (JP); Masaki Hayashi, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 115 days.

(21) Appl. No.: 11/917,072

(22) PCT Filed: May 18, 2007

(86) PCT No.: PCT/JP2007/060198

§ 371 (c)(1),
(2), (4) Date: Dec. 10, 2007

(87) PCT Pub. No.: WO2007/138882

PCT Pub. Date: Dec. 6, 2007

(65) Prior Publication Data

US 2009/0109385 A1    Apr. 30, 2009

(30) Foreign Application Priority Data

May 29, 2006  (JP)  ............................. 2006-147600

(51) Int. Cl.
*G02F 1/1335* (2006.01)
*G02B 1/08* (2006.01)

(52) U.S. Cl. ........................ 349/119; 428/1.31; 349/117
(58) Field of Classification Search ........................ None
See application file for complete search history.

(56) References Cited

U.S. PATENT DOCUMENTS 7,501,165 B2 *   3/2009   Ohmori et al. ............... 428/1.3
(Continued)

FOREIGN PATENT DOCUMENTS

WO     WO 03-032060 A1     4/2003
(Continued)

OTHER PUBLICATIONS

International Search Report of PCT/JP2007/060198, date of mailing Jun. 26, 2007.

*Primary Examiner*—Omar Rojas
(74) *Attorney, Agent, or Firm*—Westerman, Hattori, Daniels & Adrian, LLP

(57) ABSTRACT

A liquid crystal panel of the present invention includes at least a liquid crystal cell, a first polarizer disposed on one side of the liquid crystal cell, a second polarizer disposed on the other side of the liquid crystal cell and a retardation film (A) disposed between the liquid crystal cell and the first polarizer, wherein the retardation film (A) contains a thermoplastic polymer having at least a substituent (a) represented by the following formula (I) and its in-plane retardation value (Re [750]) at a wavelength of 750 nm is larger than its retardation value (Re[550]) at a wavelength of 550 nm. The liquid crystal panel has such an effect that it reduces coloring of characters or images and a color shift even if a screen is viewed from any direction at an angle range of 360°.

[Formula 1]

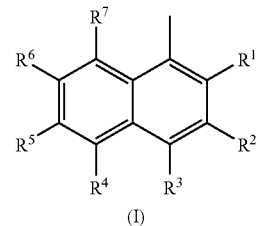

(I)

11 Claims, 10 Drawing Sheets

U.S. PATENT DOCUMENTS

2004/0239852 A1  12/2004  Ono et al.
2006/0012738 A1   1/2006  Yoshida et al.
2006/0244884 A1  11/2006  Jeon et al.

FOREIGN PATENT DOCUMENTS

WO  WO 2004-068225 A1  8/2004
WO  WO 2006-011298 A1  2/2006

* cited by examiner

LIQUID CRYSTAL PANEL AND LIQUID CRYSTAL DISPLAY DEVICE

BACKGROUND OF THE INVENTION

1. Technical Field

The present invention relates to a liquid crystal panel having a high contrast ratio in an oblique direction and to a liquid crystal display device.

2. Background Art

Liquid crystal display devices (hereinafter referred to as LCD as the case may be) are elements displaying characters and images by utilizing electro-optical properties of liquid crystal molecules. There is a vertical alignment (VA) mode as one of driving modes of LCDs. Conventional VA mode LCDs have drawbacks of having a narrow viewing angle. Further, the LCDs have a problem of coloring characters and images when a picture plane thereof is viewed from an oblique direction. In addition, the LCDs have a problem of largely varying color (referred to as a color shift) thereof depending on an azimuth. In order to solve the problems, for example, there is disclosed the use of a retardation film showing a property (referred to as inverse wavelength dispersion properties), in which a retardation value measured by light having a longer wavelength is larger than that measured by light having a shorter wavelength (see, for example, Japanese Patent Publication No. 3648240). However, in liquid crystal display devices provided with a conventional liquid crystal panel, drawbacks such as a narrow viewing angle, coloring of a picture plane and variation in color have been insufficiently improved. It is therefore desired to improve the problems.

SUMMARY OF THE INVENTION

It is an object of the present invention to provide a liquid crystal panel which has a wide viewing angle, and in which coloring of characters and images and a color shift are reduced even if a screen is viewed from any direction at an angle range of 360° and also to provide a liquid crystal display device.

The inventors of the present invention have made earnest studies to solve the above problems and, as a result, found that the above object can be attained by the following liquid crystal panel, to complete the present invention.

A liquid crystal panel of the present invention comprises at least a liquid crystal cell, a first polarizer disposed on one side of the liquid crystal cell, a second polarizer disposed on the other side of the liquid crystal cell and a retardation film (A) disposed between the liquid crystal cell and the first polarizer, wherein the retardation film (A) contains a thermoplastic polymer having at least a substituent (a) represented by the following formula (I) and an in-plane retardation value (Re [750]) at a wavelength of 750 nm is larger than an in-plane retardation value (Re[550]) at a wavelength of 550 nm.

[Formula 1]

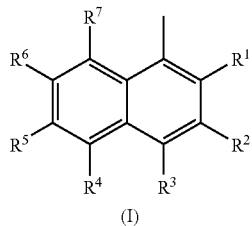

(I)

In the formula (I), $R^1$ to $R^7$ each independently represent a hydrogen atom, a halogen atom, a straight-chain or branched alkyl group having 1 to 4 carbon atoms, a straight-chain or branched alkyl halide group having 1 to 4 carbon atoms, a straight-chain or branched alkoxy group having 1 to 4 carbon atoms, a straight-chain or branched thioalkoxy group having 1 to 4 carbon atoms, a straight-chain or branched alkoxycarbonyl group, an acyloxy group, an amino group, an azide group, a nitro group, a cyano group, a hydroxy group or a thiol group (provided that $R^1$ is not a hydrogen atom).

The liquid crystal panel of the present invention has a wide viewing angle, and in which coloring of characters and images and a color shift are reduced even if a screen is viewed from any direction at an angle range of 360° by using the above retardation film (A). A liquid crystal display device provided with such a liquid crystal panel has a wide viewing angle, and in which a color shift and the like are reduced, and is superior in display properties.

In a liquid crystal panel of a preferred embodiment, the liquid crystal cell contains a liquid crystal molecule oriented in a homeotropic arrangement.

In a liquid crystal panel of a preferred embodiment, a phase delay axis direction of the retardation film (A) is substantially perpendicular to a absorption axis direction of the first polarizer.

In a liquid crystal panel of a preferred embodiment, the thermoplastic polymer is a vinyl acetal type polymer, an olefin type polymer or a carbonate type polymer.

In a liquid crystal panel of a preferred embodiment, a difference ($\Delta Re_{750-550}$=Re[750]–Re[550]) between the in-plane retardation value (Re[750]) of the retardation film (A) at a wavelength of 750 nm and the in-plane retardation value (Re[550]) of the film at a wavelength of 550 nm is 3 nm or more.

In a liquid crystal panel of a preferred embodiment, an in-plane birefringence index ($\Delta n_{xy}[590]$) of the retardation film (A) at a wavelength of 590 nm is 0.001 or more.

In a liquid crystal panel of a preferred embodiment, an absolute value of a photoelasticity coefficient of the retardation film (A) is $50 \times 10^{-12}$ ($m^2/N$) or less.

In a liquid crystal panel of a preferred embodiment, an index ellipsoid of the retardation film (A) shows the relation: nx>ny=nz or the relation: nx>ny>nz.

In a liquid crystal panel of a preferred embodiment, the liquid crystal panel further comprises a retardation film (B) whose index ellipsoid shows the relation: nx=ny>nz between the retardation film (A) and the second polarizer.

In a liquid crystal panel of a preferred embodiment, the retardation film (B) contains at least one type of polymer selected from the group consisting of a cellulose type polymer, an amideimide type polymer, an imide type polymer, an amide type polymer, an ether ether ketone type polymer and a cycloolefin type polymer.

In a liquid crystal panel of a preferred embodiment, a difference ($D_A$–$D_B$) between a wavelength dispersion value ($D_A$) of the retardation film (A) and a wavelength dispersion value ($D_B$) of the retardation film (B) is 0.05 or more. The wavelength dispersion value ($D_A$) is a value calculated from an equation: Re[750]/Re[550] where Re[750] and Re[550] are in-plane retardation values at wavelengths of 750 and 550 nm respectively and the wavelength dispersion value ($D_B$) is a value calculated from an equation: R40[750]/R40[550] where R40[750] and R40[550] are retardation values, measured when the film is inclined at an angle of 40° with respect to a normal line, at wavelengths of 750 and 550 nm respectively.

According to another aspect of the present invention, a liquid crystal display device is provided. This liquid crystal display device contains any of the above liquid crystal panels.

BEST MODE FOR CARRYING OUT THE INVENTION

Figure 1:
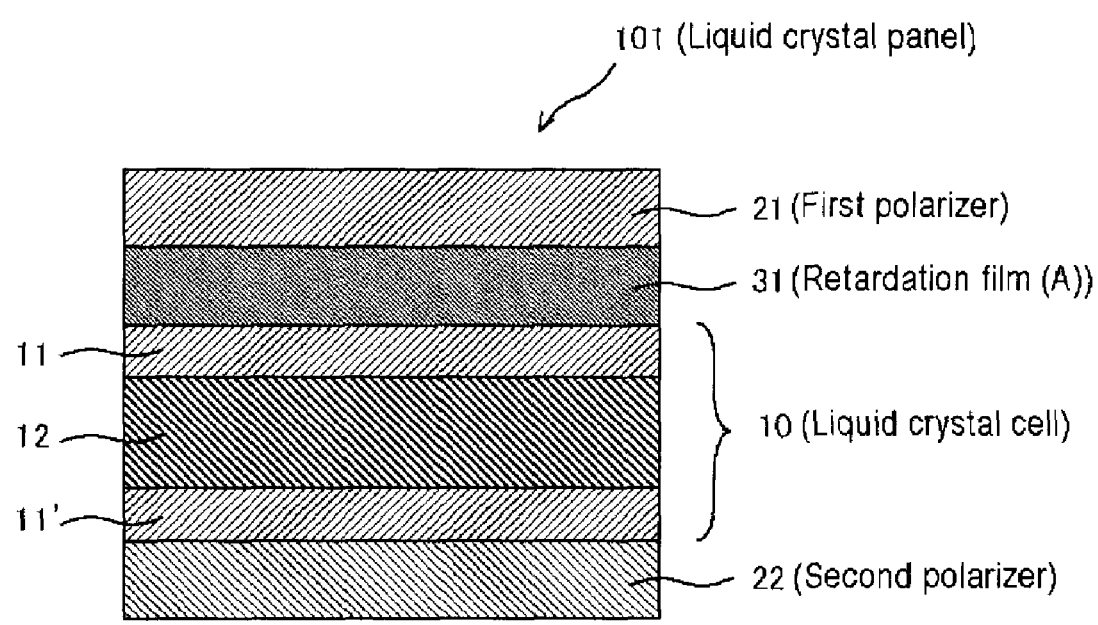
FIG. 1 is a schematic cross-sectional view of a liquid crystal panel in a first embodiment of the present invention.

Definition of Terms
The definition of each term and symbol in the present specification are as follows.
(1) Refractive Index (nx, ny, nz):
"nx" is a refractive index in a direction (specifically, a direction of a phase delay axis) having a maximum in-plane refractive index. "ny" is a refractive index in a direction (specifically, a direction of a phase advance axis) perpendicular to the phase delay axis in the plane. "nz" is a refractive index in a thickness direction.
(2) In-Plane Retardation Value
An in-plane retardation value ($Re[\lambda]$) is an in-plane retardation value of the film at 23° C. and a wavelength of $\lambda$ (nm), and a value calculated from an equation: $Re[\lambda]=(nx-ny)\times d$, when a thickness of the film is d (nm).
(3) Retardation Value at Tilt Angle of 40°:
$R40[\lambda]$ means a retardation value measured from a direction inclined at an angle of 40° with respect to a normal line of the film at 23° C. and a wavelength of $\lambda$ (nm).
(4) In-Plane Birefringence Index:
A in-plane birefringence index ($\Delta n_{xy}[\lambda]$) is a value calculated from an equation: $Re[\lambda]/d$.
(5) Retardation Value in Thickness Direction
A retardation value ($Rth[\lambda]$) in a thickness direction means a retardation value in the thickness direction of the film at 23° C. and a wavelength of $\lambda$ (nm). $Rth[\lambda]$ is a value calculated from the equation: $Rth[\lambda]=(nx-nz)\times d$ when the thickness of the film is d (nm).
(6) Birefringence Index in Thickness Direction:
A birefringence index ($\Delta n_{xz}[\lambda]$) in the thickness direction is a value calculated from the equation: $Rth[x]/d$.
(7) Nz Coefficient:
An Nz coefficient is a value calculated from the equation: $Rth[590]/Re[590]$.
(8) Wavelength Dispersion Value:
A wavelength dispersion value ($D_A$) is calculated from the equation: $Re[750]/Re[550]$. A wavelength dispersion value ($D_B$) is calculated from the equation: $R40[750]/R40[550]$.
(9) When there is the description "nx=ny" or "ny=nz" in the present specification, this includes the case where both sides of each equation are perfectly equal to each other and the case where both sides of each equation is substantially equal to each other. Therefore, even if, for example, there is the description nx=ny, this includes the case where Re[590] is less than 10 nm.
(10) The description "substantially perpendicular" in the present specification includes the case where an angle formed by two optical axes is 90±2° and preferably 90±1°. The description "substantially parallel" in the present specification includes a case where an angle formed by two optical axes is 0±2° and preferably 0°±1°.

[A. Outline of Liquid Crystal Panel]
A liquid crystal panel of the present invention comprises at least a liquid crystal cell, a first polarizer disposed on one side of the liquid crystal cell, a second polarizer disposed on the other side of the liquid crystal cell and a retardation film (A) disposed between the liquid crystal cell and the first polarizer.
The retardation film (A) contains a thermoplastic polymer having at least a substituent (a) represented by the following formula (I) and an in-plane retardation value ($Re[750]$) at a wavelength of 750 nm is larger than an in-plane retardation value ($Re[550]$) at a wavelength of 550 nm.

[Formula. 2]

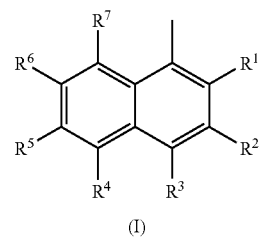

(I)

In the formula (I), $R^1$ to $R^7$ each independently represent a hydrogen atom, a halogen atom, a straight-chain or branched alkyl group having 1 to 4 carbon atoms, a straight-chain or branched alkyl halide group having 1 to 4 carbon atoms, a straight-chain or branched alkoxy group having 1 to 4 carbon atoms, a straight-chain or branched thioalkoxy group having 1 to 4 carbon atoms, a straight-chain or branched alkoxycarbonyl group, an acyloxy group, an amino group, an azide group, a nitro group, a cyano group, a hydroxy group or a thiol group (provided that $R^1$ is not a hydrogen atom).

A preferred embodiment of the liquid crystal panel of the present invention will be described with reference to FIGS. 1 to 4. FIG. 1 is a schematic cross-sectional view of a liquid crystal panel in a first embodiment of the present invention. A liquid crystal panel 101 is provided with a first polarizer 21, a retardation film (A) 31, a liquid crystal cell 10 and a second polarizer 22 at least in this order. The retardation film (A) 31 is disposed between the liquid crystal cell 10 and the first polarizer 21.

Figure 2:
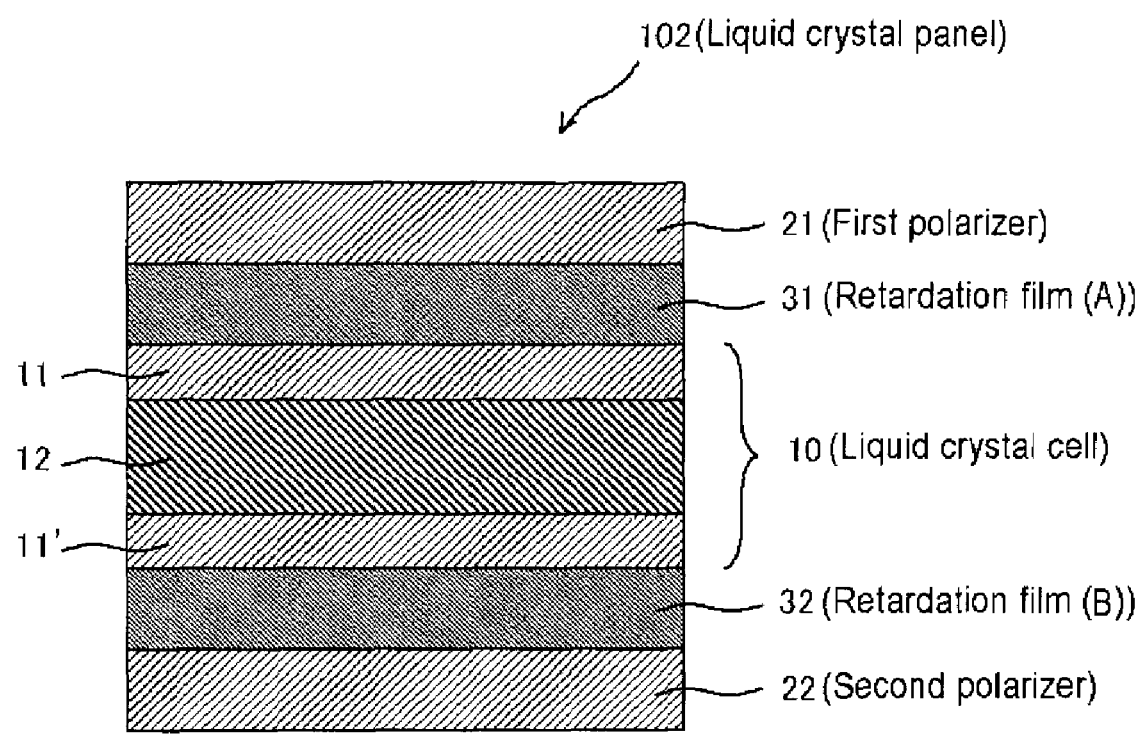
FIG. 2 is a schematic cross-sectional view of a liquid crystal panel in a second embodiment of the present invention.

FIG. 2 is a schematic cross-sectional view of a liquid crystal panel in a second embodiment of the present invention. A liquid crystal panel 102 is provided with the first polarizer 21, the retardation film (A) 31, the liquid crystal cell 10, a retardation film (B) 32 and the second polarizer 22 at least in this order. The retardation film (A) 31 is disposed between the liquid crystal cell 10 and the first polarizer 21. The retardation film (B) 32 is disposed between the liquid crystal cell 10 and the second polarizer 22. Since retardation films are disposed on both sides of a liquid crystal cell in a liquid crystal panel having such a structure, the liquid crystal panel is resistant to a strain of the liquid crystal cell even if the retardation film is expanded or shrunk. As a result, a liquid crystal panel resistant to the occurrence of optical unevenness can be structured.

Figure 3:
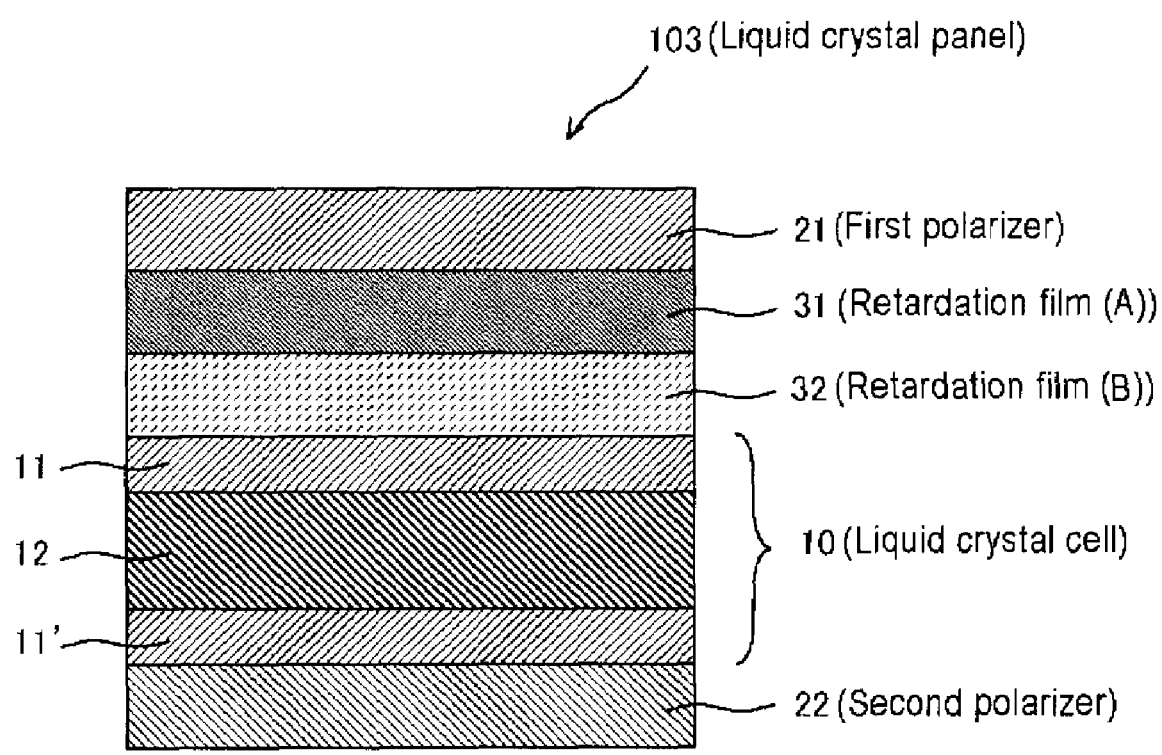
FIG. 3 is a schematic cross-sectional view of a liquid crystal panel in a third embodiment of the present invention.

FIG. 3 is a schematic cross-sectional view of a liquid crystal panel in a third embodiment of the present invention. A liquid crystal panel 103 is provided with the first polarizer 21, the retardation film (A) 31, the retardation film (B) 32, the liquid crystal cell 10 and the second polarizer 22 at least in this order. The retardation film (A) 31 is disposed between the retardation film (B) 32 and the first polarizer 21. The retardation film (B) 32 is disposed between the liquid crystal cell 10 and the retardation film (A) 31.

Figure 4:
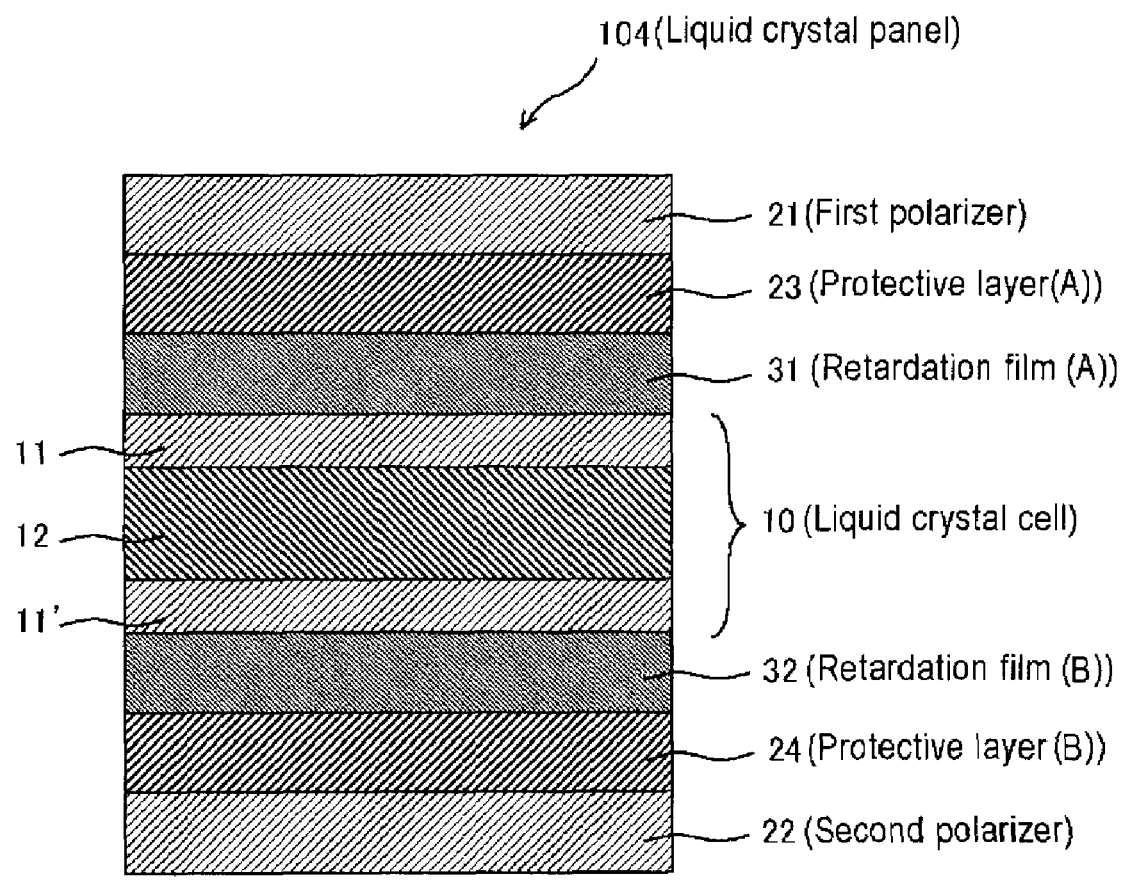
FIG. 4 is a schematic cross-sectional view of a liquid crystal panel in a fourth embodiment of the present invention.

FIG. 4 is a schematic cross-sectional view of a liquid crystal panel in a fourth embodiment of the present invention. A liquid crystal panel 104 is provided with the first polarizer 21, a protective layer (A) 23, the retardation film (A) 31, the liquid crystal cell 10, the retardation film (B) 32, a protective layer (B) 24 and the second polarizer 22 at least in this order. The protective layer (A) 23 is disposed between the first polarizer 21 and the retardation film (A) 31. The protective layer (B) 24 is disposed between the second polarizer 22 and the retardation film (B) 32. The retardation film (A) 31 is disposed between the liquid crystal cell 10 and the protective layer (A) 23. The retardation film (B) 32 is disposed between the liquid crystal cell 10 and the protective layer (B) 24. Since the retardation films (A) and (B) are not directly applied to neighboring polarizers in a liquid crystal panel having such a structure, shrinkage stress of the polarizer scarcely has influence on the retardation film. As a result, a liquid crystal panel resistant to the occurrence of optical unevenness can be structured.

Practically, an optional protective layer or surface treated layer is disposed on a side opposite to the liquid crystal cell side of the first and/or second polarizers. Also, an optional adhesive layer is disposed between structural members of the above liquid crystal panel. This "adhesive layer" means a layer that binds both surfaces of neighboring members to integrate these members with each other by practically sufficient adhesive force in a practically adequate binding time. Examples of materials forming the adhesive layer include adhesives, pressure sensitive adhesives and anchor coating agents. The above adhesive layer may have a multilayer structure in which an anchor coating agent is formed on the surface of a body to be coated and an adhesive layer or a pressure sensitive adhesive layer is formed on the anchor coating agent. Also, the adhesive layer may be a layer (also referred to as a hair line) so thin that it is not discernible to the naked eye. Though the details of the structural members of the present invention will be described, the present invention is not limited to the following specific embodiments.

[B. Liquid Crystal Cell]

With reference to FIG. 1, the liquid crystal cell 10 to be used in the present invention is provided with a pair of substrates 11 and 11' and a liquid crystal layer 12 supported between these substrates 11 and 11' as a display medium. One substrate 11' (active matrix substrate) is provided with a switching element (typically, TFT) that controls the electro-optical properties of the liquid crystal, a scanning line providing gate signals and a signal line providing source signals to this active element (not shown). The other substrate (color filter substrate) 11 is provided with a color filter. In this case, the color filter may be disposed on the active matrix substrate 11'. Alternatively, the color filter may be omitted when an RGB light source is used as back light of a liquid crystal display device like a field sequential system. An interval (cell gap) between the substrates 11 and 11' is controlled by a spacer (not shown). An orientation film (not shown) made of, for example, polyimide is formed on the substrates 11 and 11' at sides contacting with the liquid crystal layer 12. Furthermore, the above orientation film may be omitted in the case where an initial orientation of the liquid crystal molecule is controlled by utilizing, for example, a fringe electric field formed by a patterned transparent electrode.

The above liquid crystal cell preferably contains a liquid crystal molecule oriented in a homeotropic arrangement. In the present specification, the term "homeotropic arrangement" means a state in which an orientation vector of a liquid crystal molecule is oriented vertically (in a normal line direction) with a plane of the substrate resulting from an interaction between the substrate which has been subjected to orientation treatment and liquid crystal molecule. It is to be noted that the above homeotropic arrangement includes the case where the orientation vector of the liquid crystal molecule is inclined slightly with respect to the normal line direction of the substrate (namely, the case where the liquid crystal molecule has a pretilt). When the liquid crystal molecule has a pretilt, a pretilt angle thereof (angle with respect to the normal line of the substrate) is preferably 5° or less and more preferably 3° or less. When the pretilt angle is in the above range, a liquid crystal display device having a high contrast ratio is obtained.

The above liquid crystal cell preferably has an index ellipsoid satisfying the following relation: nz>nx=ny. Examples of a drive mode of the liquid crystal cell having an index ellipsoid satisfying the relation: nz>nx=ny include a vertical alignment (VA) mode and a vertical orientation type ECB (Electrically controlled Birefringence) mode. A preferable mode of the above liquid crystal cell is a vertical alignment (VA) mode.

In the above VA mode liquid crystal cell, a liquid crystal molecule oriented in a homeotropic arrangement in the presence of no electric field is made to respond in an electric field applied in the normal line direction of the substrate by utilizing a voltage control birefringence effect. Specifically, the VA mode liquid crystal cell is described in, for example, Japanese Unexamined Patent Publication Nos. 62-210423 and 4-153621. As for the VA mode liquid crystal cell, in the case of a normally black system, a liquid crystal molecule is oriented in the normal line direction of the substrate in the presence of no electric field. For this reason, the VA mode liquid crystal cell displays black when upper and lower polarizing plates are orthogonally arranged. On the other hand, the VA mode liquid crystal cell is increased in transmittance and displays white in the presence of an electric field by operating so as to incline a liquid crystal molecule at an azimuth of 45° with respect to an absorbing axis of the polarizing plate.

The above VA mode liquid crystal cell may be a liquid crystal cell in which slits are formed in an electrode or a liquid crystal cell is made to have a multi-domain by using a base material formed with projections on a surface, as disclosed in Japanese Unexamined Patent Publication No. 11-258605. Examples of such a liquid crystal cell include ASV (Advanced Super View) Mode and CPA (Continuous Pinwheel Alignment) Mode manufactured by Sharp Corporation, MVA (Multi-domain Vertical Alignment) Mode manufactured by Fujitsu Ltd., PVA (Patterned Vertical Alignment) Mode and EVA (Enhanced Vertical Alignment) Mode manufactured by Samsung Electronics Co., Ltd., SURVIVAL (Super Ranged Viewing by Vertical Alignment) Mode manufactured by Sanyo Electric Co., Ltd. and the like.

$Rth_{LC}[590]$ of the above liquid crystal cell in the presence of no electric field is preferably −500 to −200 nm and more preferably −400 to −200 nm. Here, the above $Rth_{LC}[590]$ is a retardation value which is measured in the thickness direction of the liquid crystal cell at 23° C. at a wavelength of 590 nm. The value of the above $Rth_{LC}[590]$ is properly set only by a birefringence of the liquid crystal molecule and a cell gap. The cell gap (interval between substrates) of the above liquid crystal cell is usually 1.0 to 7.0 µm.

As the above VA mode liquid crystal cell, a liquid crystal cell mounted on a commercially available liquid crystal display device may be used as it is. Examples of the commercially available liquid crystal display device mounted with the VA mode liquid crystal cell include a 37 V type liquid crystal television (trade name: "AQUOS LC-37AD5"), manufactured by Sharp Corporation, a 32 V type wide liquid crystal television (trade name: "LN32R51B"), manufactured by SUMSUNG Corporation, a liquid crystal television (trade name: "FORIS SC26XD1"), manufactured by Eizo Nanao Corporation and a liquid crystal television (trade name: "T460HW01"), manufactured by AU Optronics Corporation.

[C. Polarizer]

In the present specification, the term "polarizer" means an element that can convert natural light or polarized light into optional polarized light. The first and second polarizers used in the present invention are not particularly limited, but preferably convert natural light or polarized light into a linearly polarized light. The polarizer has a function of transmitting one polarized light component when incident light is divided into two orthogonal polarized light components, and is at least one function selected from the functions of absorbing, reflecting and scattering the other polarized light component. Each thickness of the above first and second polarizers is preferably 5 to 50 µm. The first and second polarizers are disposed such that the absorption axis direction of the above first polarizer is substantially perpendicular to the absorption axis of the above second polarizer. The above first and second polarizers may be independently the same or different.

It is preferable that the above first and second polarizers respectively have a single transmittance of 38 to 45% and a degree of polarization of 99% or more. A theoretical upper limit of the degree of polarization is 100%. When a polarizer having a single transmittance and a degree of polarization which is respectively in the above range is used, a liquid crystal display device having a high contrast ratio in a front direction is obtained.

As each of the first and second polarizers used in the present invention, an optional and adequate one is selected. The above first and second polarizers preferably contain iodine and a vinyl alcohol type polymer. Such a polarizer can be usually obtained by dying a polymer film having, as a major component, a vinyl alcohol type polymer, with an aqueous iodine solution and by stretching the film. The content of iodine in the above polarizer is preferably 2 to 5% by weight. When the content of iodine is in the above range, a polarizer having excellent optical properties is obtained.

The above vinyl alcohol type polymer may be obtained by saponification of a vinyl ester type polymer obtained by polymerizing a vinyl ester type monomer. A degree of saponification of the above vinyl alcohol type polymer is preferably 95 mol % or more. The above degree of saponification may be found according to JIS K 6726-1994. When a vinyl alcohol type polymer having a degree of saponification within the above range is used, a polarizer excellent in durability is obtained.

As an average degree of polymerization of the above vinyl alcohol type polymer, an appropriate one is selected according to the purpose. The above degree of polymerization is preferably 1200 to 3600. An average degree of polymerization may be found according to JIS K 6726-1994.

As a method of obtaining a polymer film using the above vinyl alcohol type polymer as a major component, an optional and appropriate molding processing method is adopted. Examples of the above molding processing method include a method described in Japanese Unexamined Patent Publication No. 2001-315144, "Example 1".

The polymer film using the above vinyl alcohol type polymer as a major component preferably contains a plasticizer and/or a surfactant. Examples of the above plasticizer include polyhydric alcohols such as ethylene glycol and glycerin. Examples of the above surfactant include nonionic surfactants. The content of the above plasticizer and surfactant is a content of more than 1 and 10 parts by weight or less based on 100 parts by weight of the vinyl alcohol type polymer. The above plasticizer and surfactant are used for the purpose of more improving a dying property and a stretching property of the polarizer.

As the polymer film containing the above vinyl alcohol type polymer as a major component, a commercially available film may be used as it is. Examples of the polymer film using a commercially available polyvinyl alcohol type resin as a major component include "Kuraray Vinylon Film" (trade name) manufactured by Kuraray Co., Ltd., "Tocello Vinylon Film" (trade name) manufactured by Tohcello Co., Ltd., and "Nichigo Vinylon Film" (trade name) manufactured by Nippon Synthetic Chemical Industry Co., Ltd.

Figure 5:
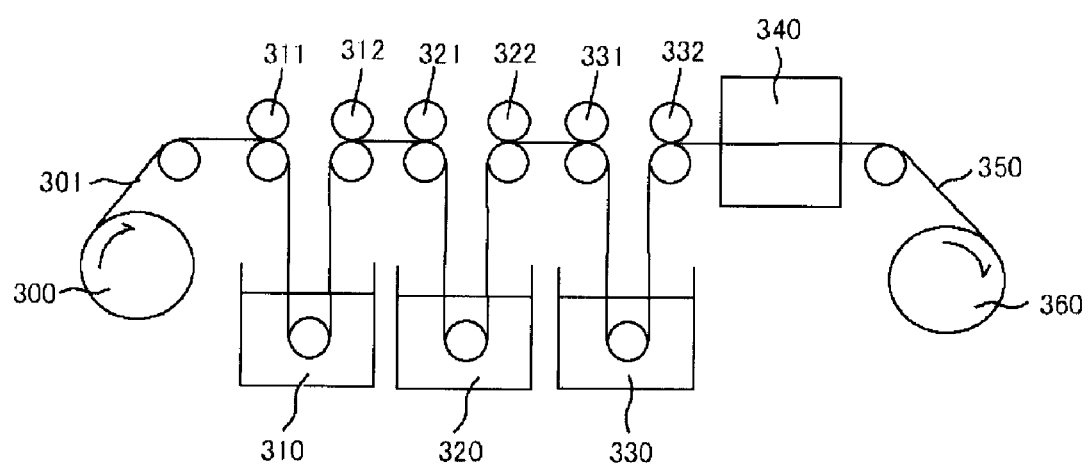
FIG. 5 is a typical view showing a concept of a typical step of producing a polarizer used in the present invention.

An example of a method for producing a polarizer will be explained with reference to FIG. 5. FIG. 5 is a typical view showing the concept of a typical process for producing the polarizer used in the present invention. In this production method, a polymer film 301 containing a vinyl alcohol type polymer as a major component is delivered from a delivery section 300 and, first, dipped in an aqueous solution bath 310 containing iodine. At this time, the polymer film 301 is subjected to a swelling and dying step while applying tensile force to the film in a longitudinal direction through rolls 311 and 312 having a different speed ratio. Then, the polymer film is dipped in an aqueous solution bath 320 containing boric acid and potassium iodide and subjected to crosslinking treatment while applying tensil force to the film in a longitudinal direction through rolls 321 and 322 having a different speed ratio. The crosslinked film is conveyed by rolls 331 and 332, dipped in an aqueous solution bath 330 containing potassium iodide and subjected to washing with water. The polymer film washed with water is dried by drying means 340 and wound by a winding section 360. A drawing ratio of a polarizer 350 is usually 5 to 7, that is 5 to 7 times an original length.

[D. Retardation Film (A)]

With reference to FIGS. 1 to 4, the retardation film (A) 31 to be used in the present invention is disposed between the liquid crystal cell 10 and the first polarizer 21. When the above retardation film (A) is disposed, a positional relation between the phase delay axis direction of the retardation film (A) and the absorption axis direction of the first polarizer is properly selected according to the purpose. Preferably the retardation film (A) and the first polarizer are disposed such that the phase delay axis direction of the above retardation film (A) is substantially perpendicular or parallel to the absorption axis direction of the first polarizer. The retardation film (A) and the first polarizer are more preferably disposed such that the phase delay axis direction of the retardation film (A) is substantially perpendicular to the absorption axis of the first polarizer.

[D-1. Material for Retardation Film (A)]

The retardation film (A) to be used in the present invention contains a thermoplastic polymer having at least a substituent (a) represented by the following formula (I). The content of the above thermoplastic polymer is preferably 50 to 100 (weight ratio) based on 100 of the total solid of the retardation film (A). The term "thermoplastic" in the present specification means such a nature that a subject material is softened to exhibit plasticity when heated and is solidified when cooled. Also, the term "polymer" means those including high polymers having a degree of polymerization (when this polymer contains a plurality of structural units, it represents a total degree of polymerization of each structural unit) of 20 or more and further low polymers (sometimes referred to as oligomers) having a degree of polymerization of 2 or more and less than 20.

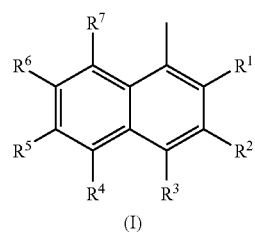

[Formula 3]

(I)

In the formula (I), $R^1$ to $R^7$ each independently represent a hydrogen atom, a halogen atom, a straight-chain or branched alkyl group having 1 to 4 carbon atoms, a straight-chain or branched alkyl halide group having 1 to 4 carbon atoms, a straight-chain or branched alkoxy group having 1 to 4 carbon atoms, a straight-chain or branched thioalkoxy group having 1 to 4 carbon atoms, a straight-chain or branched alkoxycarbonyl group, an acyloxy group, an amino group, an azide group, a nitro group, a cyano group, a hydroxy group or a thiol group (provided that $R^1$ is not a hydrogen atom).

Hereinafter, "a halogen atom, a straight-chain or branched alkyl group having 1 to 4 carbon atoms, a straight-chain or branched alkyl halide group having 1 to 4 carbon atoms, a straight-chain or branched alkoxy group having 1 to 4 carbon atoms, a straight-chain or branched thioalkoxy group having 1 to 4 carbon atoms, a straight-chain or branched alkoxycarbonyl group, an acyloxy group, an amino group, an azide group, a nitro group, a cyano group, a hydroxy group or a thiol group" is generically called "a substituent (b)" as the case may be.

In the above formula, $R^1$ is used to control a conformation of the thermoplastic polymer with which the substituent (a) is bound. Specifically, it is considered that since $R^1$ part adjacent to a connector (part connecting with a principal chain) in the formula (I) is the above substituent (b), a steric hindrance occurs between the substituent (b) and the principal chain, so that a plane structure of a naphthyl group in the above formula (I) is oriented in a direction substantively perpendicular to an oriented direction of the principal chain of the thermoplastic polymer. The use of the thermoplastic polymer having thus oriented substituent (a) represented by the formula (I) makes it possible to obtain the retardation film (A) having a larger in-plane retardation value (Re[750]) at a wavelength of 750 nm than an in-plane retardation value (Re[550]) at a wavelength of 550 nm (that is, exhibiting an inverse wavelength dispersion property).

Therefore, if $R^1$ in the formula (I) is sterically larger than a hydrogen atom, a steric hindrance possibly occurs between $R^1$ and the principal chain and therefore, $R^1$ can be properly selected from the above substituents (b).

On the other hand, $R^2$ to $R^7$ parts of the formula (I) are parts at which a steric hindrance scarcely occurs and may be therefore a hydrogen atom or the above substituent (b). It is preferable that at least $R^7$ be a hydrogen atom and it is more preferable that $R^2$ to $R^7$ be respectively a hydrogen atom.

As a method of introducing the above substituent (a) into the polymer, an optional and appropriate method is adopted. Examples of the above introduction method include (i) a method in which a polymer having a reactive part which can be substituted with the above substituent is polymerized in advance and a compound having the above substituent (a) is reacted with the reactive part of the polymer and (ii) a method in which a monomer having the above substituent (a) is copolymerized with other monomer.

The above compound and monomer having the substituent (a) are 1-naphthalene derivatives and a monomer suitable to the method of introducing the polymer is selected. Examples of the above compound and monomer having the substituent (a) include, for example, 1-naphthoaldehyde, 1-aminonaphthalene, 1-hydroxynaphthalene, or 1-naphthone and their derivatives.

As the above thermoplastic polymer, polymers having a desired structure is adopted if it has the above substituent (a). Examples of bonds of the principal chain of the above thermoplastic polymer include an acetal bond, bond among carbon atoms, carbonate bond, ester bond, amide bond, urethane bond, ether bond and siloxane bond. A preferable bond for the material forming the retardation film (A) is an acetal bond, bond among carbon atoms and carbonate bond. Specifically, the above thermoplastic polymer is preferably a vinylacetal type polymer, olefin type polymer or carbonate type polymer. This is because if the polymer is used, the retardation film (A) exhibiting inverse wavelength dispersion properties and having a small absolute value of the photoelasticity coefficient is obtained. The above olefin type polymer includes cyclic olefin type polymers besides chain olefins. Examples of the cyclic olefin type polymer include ring-opening polymers such as norbornane and dicyclopentadiene and hydrogen additives thereof.

It is particularly preferable that the above thermoplastic polymer have at least a repeat unit represented by the following formula (II). In the formula (II), there is no limitation to the order of an arrangement of each fundamental unit including l, m and n and the thermoplastic polymer may be any of alternate, random and block polymers. Such a thermoplastic polymer is superior in solubility in common solvents (for example, acetone, ethyl acetate and toluene) and has a glass transition temperature excellent in operability such as drawing operability.

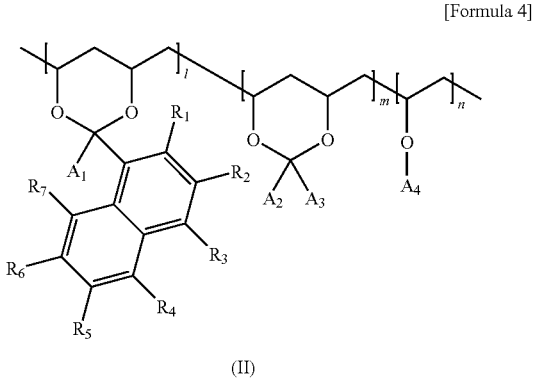

[Formula 4]

(II)

In the above formula (II), $R^1$ to $R^7$ each independently represent a hydrogen atom, a halogen atom, a straight-chain or branched alkyl group having 1 to 4 carbon atoms, a straight-chain or branched alkyl halide group having 1 to 4 carbon atoms, a straight-chain or branched alkoxy group having 1 to 4 carbon atoms, a straight-chain or branched thioalkoxy group having 1 to 4 carbon atoms, a straight-chain or branched alkoxycarbonyl group, an acyloxy group, an amino group, an azide group, a nitro group, a cyano group, a hydroxy group or a thiol group (provided that $R^1$ is not a hydrogen atom). $A^1$ and $A^2$ each independently represent a hydrogen atom, a straight-chain or branched alkyl group having 1 to 4 carbon atoms or a substituted or unsubstituted phenyl group. $A^3$ represents a hydrogen atom, a straight-chain or branched alkyl group having 1 to 4 carbon atoms, a substituted or unsubstituted cycloalkyl group having 5 to 10 carbon atoms, a substituted or unsubstituted phenyl group, a substituted or unsubstituted naphthyl group or a substituted or unsubstituted heterocyclic group. $A^4$ represents a hydrogen atom, a straight-chain or branched alkyl group having 1 to 4 carbon atoms, a benzyl group, a silyl group, a phosphoric acid group, an acyl group, a benzoyl group or a sulfonyl group.

The thermoplastic polymer (vinyl acetal type polymer) having a repeat unit represented by the above formula (II) is produced by a method involving a step of dispersing or dissolving, in a solvent, for example, a vinyl alcohol type polymer and at least two types of compounds selected from aldehyde compounds and/or ketone compounds to react in the presence of an acid catalyst. In the condensation reaction of the above vinyl alcohol type polymer, at least two types of compounds selected from aldehyde compounds and/or ketone compounds may be reacted either simultaneously or one after another (sequential reaction). The degree of acetalization of the above vinyl acetal type polymer is preferably 40 to 99 mol %. This reaction is a condensation reaction with the vinyl alcohol type polymer and is called acetalization when an aldehyde compound is used. It is to be noted that the term "acetalization" includes acetalization (ketalization) using a ketone compound.

In the above formula (II), a fundamental unit 1 is a unit formed by a condensation reaction of the vinyl alcohol type polymer with 1-naphthaldehydes or 1-naphthones. Examples of the above 1-naphthaldehydes include 2-methoxy-1-naphthaldehyde, 2-ethoxy-1-naphthaldehyde, 2-propoxy-1-naphthaldehyde, 2-methyl-1-naphthaldehyde, 2,6-dimethyl-1-naphthaldehyde, 2,4-dimethyl-1-naphthaldehyde and 2-hydroxy-1-naphthaldehyde. Examples of the above 1-naphtones include 2-hydroxy-1-acetonaphthone and 8'-hydroxy-1'-benzonaphthone.

In the above formula (II), the fundamental unit m is a unit formed by a condensation reaction of the vinyl alcohol type polymer with an optional aldehyde compound or ketone compound. Examples of the aldehyde compound include formaldehyde, acetaldehyde, 1,1-diethoxyethane (acetal), propionaldehyde, n-butylaldehyde, cyclohexanecarboxyaldehyde, 5-norbornane-2-carboxyaldehyde, benzaldehyde, 3,4-dimethoxybenzaldehyde, 2-nitrobenzaldehyde, 4-cyanobenzaldehyde, 4-carboxybenzaldehyde, 4-phenylbenzaldehyde, 4-fluorobenzaldehyde, 1-naphthoaldehyde, 2-naphthoaldehyde, 6-methoxy-2-naphthoaldehyde, 3-methyl-2-thiophenecarboxyaldehyde and 2-pyridinecarboxyaldehyde.

Examples of the ketone compound include acetone, ethyl methyl ketone, diethyl ketone, t-butyl ketone, dipropyl ketone, allyl ethyl ketone, acetophenone, p-methylacetophenone, 4'-aminoacetophenone, 4'-methoxyacetophenone, 2'-hydroxyacetophenone, 3'-nitroacetophenone, benzalacetophenone, propiophenone, benzophenone, 4-nitrobenzophenone, 2-methylbenzophenone, p-bromobenzophenone, cyclohexyl(phenyl)methanone, 2-butyronaphthone and 1-acetonaphtone.

In the above formula (II), $A^4$ is a group that protects residual hydroxyl groups (also referred to as end cap treatment) and is introduced to adjust an absorption coefficient of the polymer to an adequate value. If the absorption coefficient of the polymer represented by the above formula (II) is made to be small, the retardation film (A) having high transparency and high stability of retardation can be obtained. In this case, it is unnecessary that the hydroxyl group may be subjected to end cap treatment though this depends on the application and purpose for which the retardation film of the present invention is used. That is, $A^4$ may be unchanged but be a hydrogen atom.

As the above $A^4$, for example, an optional proper substituent (protective group) is used which is capable of reacting with a hydroxyl group (which can be processed by end cap treatment) after the polymer having residual hydroxyl groups is obtained. Examples of the substituent (protective group) include a benzyl group, 4-methoxyphenylmethyl group, methoxymethyl group, trimethylsilyl group, triethylsilyl group, t-butyldimethylsilyl group, acetyl group, benzoyl group, methanesulfonyl group and bis-4-nitrophenyl phosphite. As to the reaction condition of the above end cap treatment, for example, the end cap treatment may be carried out by stirring the polymer having residual hydroxy groups and a chloride of the intended substituent at 25 to 100° C. for 1 to 20 hours in the presence of a catalyst such as 4 (N,N-dimethylamino)pyridine. When the above substituent is introduced, the retardation film (A) having high transparency and high stability of retardation even in the environment of heat and humidity can be obtained.

In the above formula (II), ratios of the fundamental units l, m and n are respectively set to an adequate value optionally according to the purpose. The ratio of the above fundamental unit l is preferably 2 to 40 mol % and more preferably 2 to 30 mol %. The ratio of the above fundamental unit m is preferably 20 to 80 mol % and more preferably 30 to 75 mol %. The ratio of the above fundamental unit n is preferably 1 to 60 mol % and more preferably 5 to 50 mol %. This is on the premise that the following relation is established: l+m+n=100 mol %. The use of a polymer obtained when each fundamental unit is in the above range makes it possible to obtain the retardation film (A) excellent in inverse wavelength dispersion properties and in development of retardation by drawing and having a large in-plane birefringence ($\Delta n_{xy}$).

A weight average molecular weight of the above thermoplastic polymer is preferably 1,000 to 1,000,000 and more preferably 3,000 to 500,000. When the weight average molecular weight is in the above range, the retardation film (A) superior in mechanical strength can be obtained. The above weight average molecular weight is a value found by a GPC method (based on polystyrene) using tetrahydrofuran as a developing solvent.

A glass transition temperature of the above thermoplastic polymer is preferably 100 to 190° C. and more preferably 110 to 170° C. When the glass transition temperature is in the above range, the retardation film (A) superior in heat resistance and molding processability can be obtained. The glass transition temperature can be found by a DSC method according to JIS K 7121-1987.

The above retardation film (A) may contain optional and appropriate additives. Examples of the above additives include a plasticizer, heat stabilizer, light stabilizer, lubricant, antioxidant, ultraviolet absorbers, flame retardant, antistatic agent, mutual solubilizing agent, crosslinking agent, thickener and the like. The amount of the above additives is preferably a value more than 0 and 30 parts by weight or less based on 100 parts by weight of the above thermoplastic polymer.

[D-2. Various Properties of Retardation Film (A)]

The retardation film (A) used in the present invention has a larger in-plane retardation value (Re[750]) at a wavelength of 750 nm than an in-plane retardation value (Re[550]) at a wavelength of 550 nm. The retardation film (A) exhibits the so-called inverse wavelength dispersion property.

A difference ($\Delta Re_{750-550}$=Re[750]–Re[550]) between the in-plane retardation value (Re[750]) of the retardation film (A) at a wavelength of 750 nm and the in-plane retardation value (Re[550]) of the film at a wavelength of 550 nm is preferably 3 nm or more and more preferably 4 to 25 nm. The use of the retardation film (A) having a $\Delta Re_{750-550}$ within the above range enables production of a liquid crystal display device which has a wide viewing angle, and in which the coloring of characters and images and also a color shift are reduced even if a screen is viewed from any direction at an angle range of 360°.

It is conventionally difficult to manufacture a retardation film having a large $\Delta Re_{750-550}$. Since the retardation film (A) of the present invention can increase $\Delta Re_{750-550}$, wavelength dispersion properties ideal in, particularly, red wavelength region can be obtained. Therefore, leakage of light of back light to a visible side when a black image is displayed can be reduced by a liquid crystal panel using this retardation film (A). Therefore, a liquid crystal display device can be prevented from coloring red.

A wavelength dispersion value ($D_A$) of the above retardation film (A) is preferably more than 1, is more preferably 1.02 to 1.30 and particularly preferably 1.04 to 1.15. Here, the wavelength dispersion value ($D_A$) is a value calculated from the equation: Re[750]/Re[550]. A liquid crystal display device having more excellent display properties can be obtained by using the retardation film (A) having a $D_A$ within the above range.

The transmittance (T[590]) of the above retardation film (A) at a wavelength of 590 nm is preferably 85% or more and more preferably 90% or more.

The in-plane birefringence ($\Delta n_{xy}$[590]) of the above retardation film (A) at a wavelength of 590 nm is 0.001 or more and more preferably 0.0012 or more. A retardation film increased in the above $\Delta n_{xy}$[590] has a desired retardation value and can be manufactured such that the retardation film (A) has a lower thickness. When the above retardation film (A) particularly contains a thermoplastic polymer having at least a repeat unit represented by the above formula (II), the retardation film (A) has a larger $\Delta n_{xy}$[590] than a polymer having other inverse wavelength dispersion properties. The above $\Delta n_{xy}$[590] is preferably 0.005 or less from the viewpoint of the optical uniformity of the film.

An absolute value (C[590]) (m$^2$/N) of a photoelasticity coefficient of the above retardation film (A) is preferably 50×10$^{-12}$ or less and more preferably 30×10$^{-12}$ or less. A retardation film decreased in the absolute value of the photoelasticity coefficient within the above range is resistant to the occurrence of optical nonuniformity. The above C[590] is preferably 50×10$^{-12}$ or more from the viewpoint of obtaining the retardation film (A) having a large $\Delta n_{xy}$[590].

The index ellipsoid of the above retardation film (A) shows the relation: nx>ny=nz (also referred to as positively uniaxial properties) or the relation: nx>ny>nz (also referred to as negative biaxial properties). When the index ellipsoid of the above retardation film (A) shows the relation: nx>ny=nz, Re[590] and Rth[590] of the above retardation film (A) are respectively 10 nm or more and |Rth[590]–Re[590]| is less than 10 nm. When the index ellipsoid of the above retardation film (A) shows the relation: nx>ny>nz, Re[590] and Rth[590] of the above retardation film (A) are respectively 10 nm or more and Rth[590]–Re[590] is 10 nm or more.

When the index ellipsoid of the above retardation film (A) shows the relation: nx>ny=nz, Re[590] of the above retardation film (A) is preferably 60 to 180 nm and more preferably 70 to 170 nm. The Nz coefficient of the retardation film (A) showing this relation is preferably more than 0.9 and less than 1.1.

The index ellipsoid of the above retardation film (A) shows the relation: nx>ny>nz, Re[590] of the above retardation film (A) is preferably 40 to 160 nm and more preferably 50 to 150 nm. Rth[590] of the above retardation film (A) is preferably 60 to 180 nm and more preferably 70 to 170 nm. The Nz coefficient of the retardation film (A) showing this relation is preferably 1.1 to 6.0 and more preferably 1.1 to 4.0.

When the above retardation film (A) having the structure as shown in FIG. 4 is used, the retardation value of the above retardation film (A) can be set optionally and adequately corresponding to the index ellipsoid and retardation value of the protective layer (A). When the index ellipsoid of the protective layer (A) shows the relation: nx=ny>nz (negatively uniaxial properties), Re$_A$[590] of the above retardation film (A) is set so that the sum (Re$_A$[590]+Rth$_H$[590]) of Re$_A$[590] and Rth$_H$[590] of the protective layer (A) is preferably 100 to 180 nm. Specifically, when the above Rth$_H$[590] is, for example, 60 nm, Re$_A$[590] of the above retardation film (A) is preferably 40 to 120 nm. The details of the protective layer (A) will be described later.

The thickness of the above retardation film (A) can be optionally set to a proper value according to the purpose. The above thickness is preferably 20 to 200 μm and more preferably 30 to 100 μm. If the retardation film (A) having a thickness within the above range is used, practically sufficient mechanical strength and intended optical properties are obtained.

The water absorbance of the above retardation film (A) is preferably 8% or less and more preferably 2 to 6%. The moisture permeability of the retardation film (A) is preferably 400 g/m$^2$ or less and more preferably 10 to 200 g/m$^2$. When the above retardation film (A) particularly contains a thermoplastic polymer having at least a repeat unit represented by the above formula (II), it has the properties that has a higher water absorbance and lower moisture permeability than a film containing other common polymers. Such a retardation film (A) has high adhesion to the polarizer and can also prevent the polarizer from being deteriorated by water vapor.

[D-3. Method of Producing Retardation Film (A)]

In an embodiment, the retardation film (A) used in the present invention is manufactured by molding the above thermoplastic polymer or a resin composition containing the above thermoplastic polymer into a sheet form to obtain a polymer film (A), and by stretching the polymer film (A) to orient the principal chain and side chains in the thermoplastic polymer.

The above retardation film (A) can be obtained by an optional and appropriate molding processing method. Examples of the above molding processing method include a compression molding method, transfer molding method, injection molding method, extrusion molding method, blow molding method, powder molding method, FRP molding method, solvent casting method and the like.

As a method of stretching the above polymer film (A), an optional and appropriate stretching method can be adopted according to the purpose. Examples of the above stretching method include a vertical uniaxial stretching method, horizontal uniaxial stretching method, vertical-horizontal simultaneous biaxial stretching method, vertical-horizontal sequential biaxial stretching method, and the like. The stretching direction may be either a longitudinal direction (MD direction) or a wide direction (TD direction) of the film. Also, the film may be stretched in an oblique direction by using a stretching method described in Japanese Unexamined Patent Publication No. 2003-262721, FIG. 1.

A condition for stretching the above polymer film (A) is optionally set. A stretching temperature is based on a glass transition temperature (Tg) of the polymer film (A) and is preferably Tg+1° C. to Tg+30° C. A stretching ratio is preferably a value more than 1 and 3 or less. The feed speed when the film is stretched is preferably 0.5 to 30 m/min from the viewpoint of mechanical accuracy and stability. If such a condition is selected, the retardation value is easily uniformed and also the retardation film (A) having high transparency can be obtained.

[E. Retardation Film (B)]

It is preferable that the liquid crystal panel of the present invention be further provided with a retardation film (B), in which the index ellipsoid shows the relation: nx=ny>nz (negatively uniaxial properties), between the above retardation film (A) and the above second polarizer. The above retardation film (B) is preferably disposed so as to be adjacent to the liquid crystal cell, in order to optically compensate the birefringence (nz>nx=ny) of the liquid crystal cell. In an embodiment, the retardation film (B) is disposed between the liquid crystal cell and the second polarizer as shown in FIGS. 2 and 4. In another embodiment, the retardation film (B) is disposed between the liquid crystal cell and the retardation film (A) as shown in FIG. 3. Such a liquid crystal panel can obtain a wider viewing angle.

[E-1. Material for Retardation Film (B)]

As a material used to form the above retardation film (B), an optional and appropriate forming material is adopted on a conditions in which the index ellipsoid of the retardation film (B) shows the relation: nx=ny>nz. The above retardation film (B) preferably includes at least one type of polymer selected from the group consisting of a cellulose type polymer, amideimide type polymer, imide type polymer, amide type polymer, ether-ether ketone type polymer and cycloolefin type polymer. These polymers have the properties that a retardation film in which the index ellipsoid shows the relation: nx=ny>nz is easily obtained because molecules easily orient spontaneously during an evaporation process of a solvent when these polymers are made into a sheet form by a solvent casting method. These polymers may be obtained by a method described in U.S. Pat. No. 5,344,916.

As the material used to form the above retardation film (B), a liquid crystal composition may be used. When such a liquid crystal composition is used, the above retardation film (B) includes a solidified layer or curing layer of a liquid crystal composition containing a bar-like liquid crystal compound oriented in a planar arrangement or a solidified layer or curing layer of a liquid crystal composition containing a discotheque liquid crystal compound oriented in a columnar arrangement. The use of the liquid crystal compound makes it possible to obtain a thin type retardation film because the birefringence in the thickness direction is large.

A retardation film made of the above solidified layer or curing layer of a liquid crystal composition containing a bar-like liquid crystal compound oriented in a planar arrangement may be obtained, for example, by a method described in Japanese Unexamined Patent Publication No. 2003-287623. The above retardation film made of a solidified layer or curing layer of a liquid crystal composition containing a discotheque liquid crystal compound oriented in a columnar arrangement may be obtained, for example, by a method described in Japanese Unexamined Patent Publication No. 9-117983.

It is particularly preferable that the above retardation film (B) contains an imide type polymer. The above imide type polymer preferably contains a hexafluoroisopropylidene group and/or trifluoromethyl group. It is more preferable that the above imide type polymer have at least a repeat unit represented by the following formula (III) or a repeat unit represented by the following formula (IV). Imide type polymers containing these repeat units are superior in transparency and solubility in general solvents and have a large birefringence in the thickness direction. Because the imide type polymers exhibit sharp positive wavelength dispersion properties, a relation (ΔD) of wavelength dispersion properties between the imide type polymer and the retardation film (A) which will be described later can be increased.

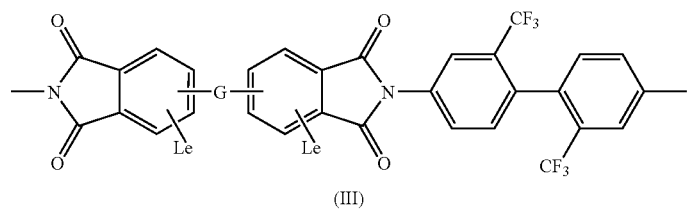

[Formula 5]

(III)

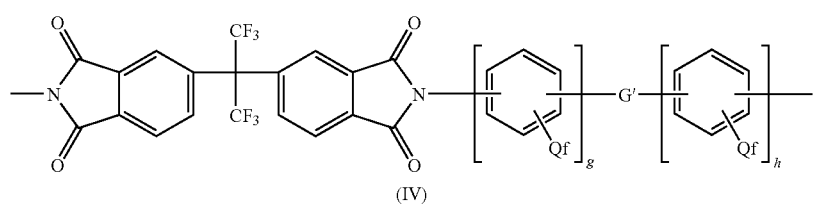

[Formula 6]

(IV)

In the above formulas (III) and the above formula (IV), G and G' represent, a covalent bond or a group respectively independently selected from the group consisting of $CH_2$ group, $C(CH_3)_2$ group, $C(CF_3)_2$ group, $C(CX_3)_2$ group (X is halogen), CO group, oxygen, sulfur, $SO_2$ group, $Si(CH_2CH_3)_2$ group, and $N(CH_3)$ group, and may be respectively the same or different.

In the above formula (III), L is a substituent group, and e represent the number of substitutions thereof. The group L is, for example, a halogen, $C_1$ to $C_3$ halogenated alkyl group, phenyl group, or substituted phenyl group, and, in the case where plural L are present, they are respectively the same or different. The number e is an integer from 0 to 3.

In the above formulas (IV), Q is a substituent group, and f represents the number of substitutions thereof. The group Q is, for example, an atom or a group selected from the group consisting of hydrogen, halogen, alkyl group, substituted alkyl group, nitro group, cyano group, thioalkyl group, alkoxy group, aryl group, substituted aryl group, alkylester group, and substituted alkylester group, and, in the case where plural Q are present, they are respectively the same or different. The number f is an integer from 0 to 4, and the number g and h are an integer from 1 to 3.

The above imide type polymer may be obtained by reacting a tetracarboxylic acid dianhydride with a diamine. The repeat unit represented by the formula (III) may be obtained by using 2,2'-bis(trifluoromethyl)-4,4'-diaminobiphenyl as a diamine and by reacting this diamine with a tetracarboxylic acid dianhydride having at least two aromatic rings. The repeat unit of the formula (IV) may be obtained by using 2,2-bis(3,4-dicarboxylphenyl)hexafluoropropanoic acid dianhydride as a tetracarboxylic acid dianhydride and by reacting this tetracarboxylic acid dianhydride with a diamine having at least two aromatic rings. The above reaction may be a chemical imidation reaction run in two stages or a thermal imidation reaction run in one stage.

As the tetracarboxylic acid dianhydride, an optional and appropriate one is selected. Examples of the above tetracarboxylic acid dianhydride include 2,2-bis(3,4-dicarboxyphenyl)hexafluoropropanoic acid dianhydride, 3,3',4,4'-benzophenonetetracarboxylic acid dianhydride, 2,3,3',4-benzophenonetetracarboxylic acid dianhydride, 2,2',3,3'-benzophenonetetracarboxylic acid dianhydride, 2,2'-dibromo-4,4',5,5'-biphenyltetracarboxylic acid dianhydride, 2,2'-bis(trifluoromethyl)-4,4',5,5'-biphenyltetracarboxylic acid dianhydride, 3,3',4,4'-biphenyltetracarboxylic acid dianhydride, 4,4'-bis(3,4-dicarboxyphenyl)ether dianhydride, 4,4'-oxydiphthalic acid dianhydride, 4,4'-bis(3,4-dicarboxyphenyl)sulfonic acid dianhydride, bis(2,3-dicarboxyphenyl)methanoic acid dianhydride and bis(3,4-dicarboxyphenyl)diethylsilanoic acid dianhydride.

As the above diamine, an optional and appropriate one is selected. Examples of the above diamine include 2,2'-bis(trifluoromethyl)-4,4'-diaminobiphenyl, 4,4'-diaminobiphenyl, 4,4'-diaminophenylmethane, 4,4'-(9-fluorenylidene)-dianiline, 3,3'-dichloro-4,4'-diaminodiphenylmethane, 2,2'-dichloro-4,4'-diaminobiphenyl, 4,4'-diaminodiphenyl ether, 3,4'-diaminodiphenyl ether, 4,4'-diaminodiphenylsulfone and 4,4'-diaminodiphenyl thioether.

The weight average molecular weight (Mw) of the above imide type polymer is preferably 20,000 to 180,000. The weight average molecular weight (Mw) may be found by using a dimethylformamide solution (1 L of a dimethylformamide solution by adding 10 mM of lithium bromide and 10 mM of phosphoric acid to adjust its volume) as a developing solution based on polyethylene oxide. An imidization ratio of the polymer is preferably 95% or more. The above imidization ratio can be found from an integral intensity ratio of a proton peak derived from polyamic acid that is polyimide precursor to a proton peak derived from polyimide.

[E-2. Various Properties of Retardation Film (B)]

The above retardation film (B) has the properties that the index ellipsoid shows the relation: nx=ny>nz. In this case, Re[590] of the above retardation film (B) is less than 10 nm and preferably less than 5 nm. Rth[590] of the above retardation film (B) is 10 nm or more, preferably 100 to 350 nm and more preferably 120 to 310 nm.

When the above retardation film (B) having the structure shown in FIG. 4 is used, the retardation value of the above retardation film (B) can be set optionally and adequately in consideration of the optical properties of the protective layer (B). When, for example, the index ellipsoid of the protective layer (B) shows the relation: nx=ny>nz, $Rth_B[590]$ of the above retardation film (B) is set so that the sum ($Rth_B[590]$+$Rth_H[590]$) of $Rth_B[590]$ and $Rth_H[590]$ of the protective layer (B) is preferably 100 to 350 nm. Specifically, when the above $Rth_H[590]$ is, for example, 60 nm, $Rth_B[590]$ of the above retardation film (B) is preferably 40 to 290 nm. The details of the protective layer (B) will be described later.

The transmittance (T[590]) of the above retardation film (B) at a wavelength of 590 nm is preferably 85% or more and more preferably 90% or more.

The birefringence ($\Delta n_{xz}[590]$) in the thickness direction of the above retardation film (B) at a wavelength of 590 nm is preferably 0.005 or more, more preferably 0.01 or more and particularly preferably 0.03 or more. A retardation film increased in the above $\Delta n_{xz}[590]$ has a desired retardation value and can be manufactured so as to be a lower thickness. The above $\Delta n_{xz}[590]$ is preferably 0.08 or less and more preferably 0.06 or less from the viewpoint of the optical uniformity of the film.

The above retardation film (B) preferably has the properties that a retardation value at a tilt angle of 40° (R40[750]) at a wavelength of 750 nm is smaller than the retardation value at a tilt angle of 40° (R40[550]) at a wavelength of 550 nm. The retardation film (B) shows the so-called positive wavelength dispersion properties.

With regard to the above retardation film (B), a difference ($\Delta R40_{550-750}$=R40[550]−R40[750]) between the retardation value at a tilt angle of 40° (R40[550]) at a wavelength of 550 nm and the retardation value at a tilt angle of 40° (R40[750]) at a wavelength of 750 nm is preferably 5 nm or more and more preferably 5 to 20 nm. The use of the retardation film (B) having a $\Delta R40_{550-750}$ within the above range ensures that a liquid crystal display device can be obtained which has a wide viewing angle, and in which the coloring of characters and images and a color shift are reduced even if the screen is viewed from any direction at an angle range of 360°.

$D_B$ of the above retardation film (B) is preferably less than 1.0, more preferably 0.85 to 0.98 and particularly preferably 0.90 to 0.96. Here, the wavelength dispersion value ($D_B$) is a value calculated from the equation: R40[750]/R40[550]. The use of the retardation film (B) having a $D_B$ within the above range makes it possible to obtain a liquid crystal display device having more excellent display properties.

A difference ($\Delta D=D_A-D_B$) between the wavelength dispersion value ($D_A$) of the above retardation film (A) and the wavelength dispersion value ($D_B$) of the above retardation film (B) is preferably 0.05 or more, more preferably 0.07 to 0.17 and particularly preferably 0.09 to 0.15. When a retardation film having a $\Delta D$ within the above range is used, the optical compensation of the liquid crystal panel is made more optimally with the result that a liquid crystal display device having more excellent display properties can be obtained.

The thickness of the above retardation film (B) may be optionally set to an appropriate value according to the purpose. The above thickness is preferably 0.5 to 100 µm. When an imide type polymer is used as the above retardation film (B), the thickness of the retardation film (B) is preferably 0.5 to 100 µm and more preferably 0.5 to 6 µm. If the thickness of the retardation film (B) is in the above range, the retardation film (B) which is a thin type and has intended optical properties can be obtained.

[E-3. Method of Producing Retardation Film (B)]

As a method of producing the retardation film (B) to be used in the present invention, an appropriate method is selected from an optional molding processing method and stretching method besides a method utilizing the spontaneous molecular orientation of a polymer molecule and a method using a liquid crystal composition. Examples of the molding processing method and stretching method include the methods described in the above D-3.

[F. Protective Layers (A) and (B)]

The protective layers (A) and (B) used in the present invention are used to decrease the shrinkage and expansion of the adjacent polarizer and to improve mechanical strength. The materials used for the above protective layers (A) and (B) may be the same or different. The thicknesses of the above protective layers (A) and (B) are respectively preferably 20 to 100 µm.

The index ellipsoids of the protective layers (A) and (B) respectively show the relation: nx=ny>nz or the relation: nx=ny=nz (sometimes referred as being optically isotropic). When the index ellipsoid of the protective layer shows the relation: nx=ny>nz, Re[590] of the above protective layer is less than 10 nm and Rth[590] is 10 to 80 nm. When the index ellipsoid of the above protective layer shows the relation: nx=ny=nz, Re[590] and Rth[590] of the above protective layer are respectively less than 10 nm.

As the materials for the above protective layers (A) and (B), optional and appropriate materials may be adopted. The above protective layer preferably includes polymer films containing at least one polymer selected from the group consisting of cellulose type polymers, cycloolefin type polymers and acryl type polymers. The polymer film having the above cellulose type polymer can be obtained, for example, by a method described in Japanese Unexamined Patent Publication No. 7-112446, Example 1. The polymer film having the above cycloolefin type polymer can be obtained, for example, by a method described in Japanese Unexamined Patent Publication No. 2001-350017. The polymer film having the above acryl type polymer can be obtained by a method described in Japanese Unexamined Patent Publication No. 2004-198952, Example 1.

[G. Liquid Crystal Display Device]

Figure 6:
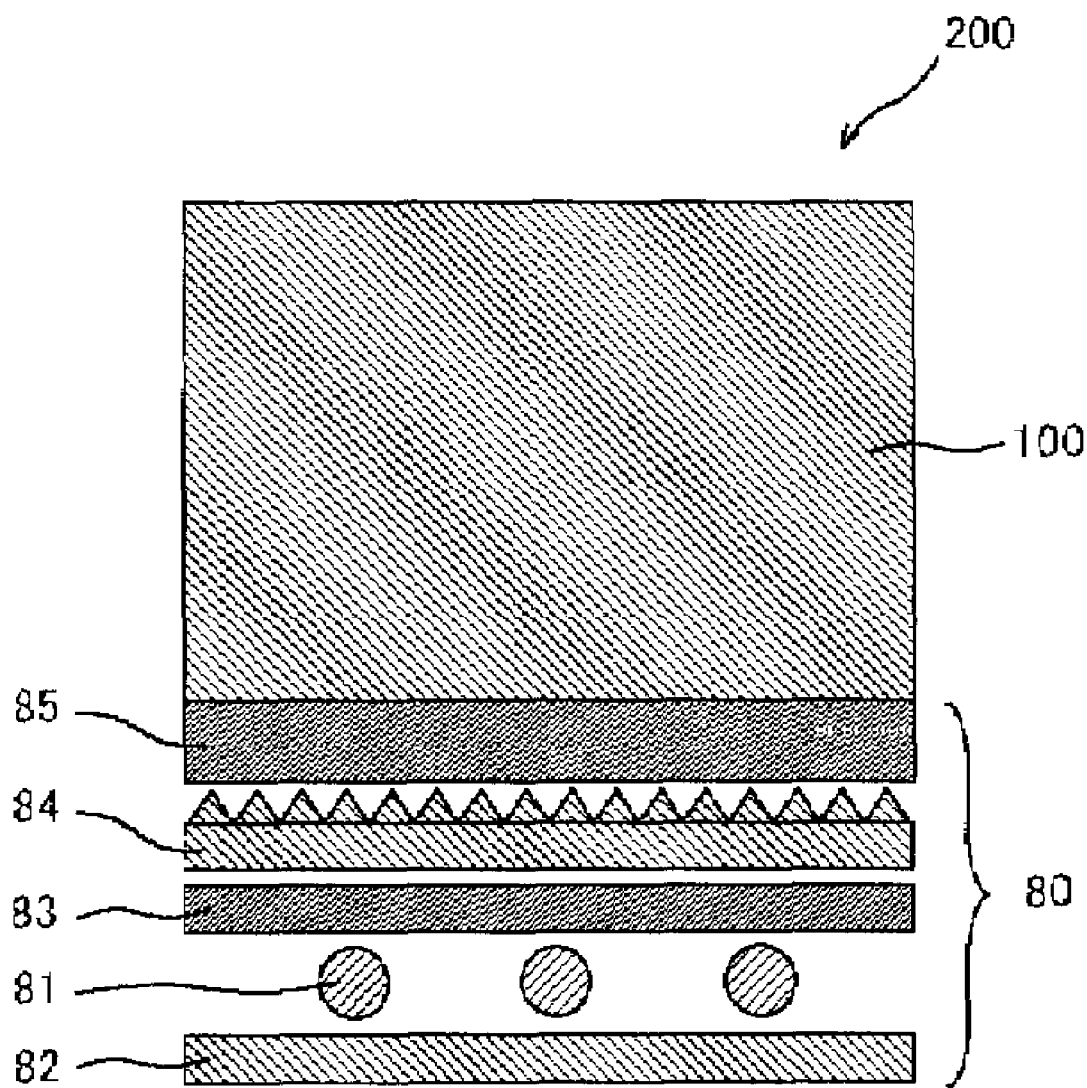
FIG. 6 is a schematic cross-sectional view of a liquid crystal display device in a preferred embodiment of the present invention.

The liquid crystal display device of the present invention includes the above liquid crystal panel. FIG. 6 is a schematic cross-sectional view of a liquid crystal display device in a preferred embodiment of the present invention. It is noted that the ratio of the length, width and thickness of each structural member shown in FIG. 6 are different from an actual one for the sake of visibility. A liquid crystal display device 200 is provided with at least a liquid crystal panel 100 and a back-light unit 80 disposed on one side of the liquid crystal panel 100. The illustrating examples show the case where a direct radiation system is adopted as the back-light unit. However, a side-light system may be used as the back-light unit.

When the direct radiation system is adopted, the above back-light unit 80 is preferably provided with at least a light source 81, a reflecting film 82, a diffusion plate 83, a prism sheet 84 and a brightness-improving film 85. When the side-light system is adopted, the back-light unit is further provided with, in addition to the above structures, at least a light conductive plate and a light reflector. The optical members illustrated in FIG. 6 may be partly omitted or replaced with other optical members corresponding to the application of the liquid crystal display device including the illumination system of the liquid crystal display device and drive mode of a liquid crystal cell as long as the effect of the present invention is obtained.

The above liquid crystal display device of the present invention may be either a transmitting type in which light is emitted from the backside of the liquid crystal panel or a reflecting type in which light is emitted from the visual side of the liquid crystal panel. Furthermore, the above liquid crystal display device of the present invention may be a semi-transparent type having both the natures of the transmitting type and reflecting type.

The liquid crystal display device of the present invention is characterized, for example, by a wide viewing angle. The viewing angle (a range of polar angle at a contrast ratio of 10 or more) of the above liquid crystal display device is preferably 160° or more in a vertical direction and 160° or more in a lateral direction. The average of contrast ratios at a polar angle of 60° and an azimuth of 0 to 360° is preferably 50 or more and more preferably 80 to 200. Moreover, a minimum value of contrast ratio of the above liquid crystal display device at a polar angle of 60° and an azimuth of 0 to 360° is preferably 20 or more and more preferably 30 to 150.

The liquid crystal display device of the present invention is characterized by small coloring of red even if the screen is viewed from any direction at an angle range of 360° when, for example, the screen displaying a black image is viewed from an oblique direction. In the case of the above liquid crystal display device, the average of a* at a polar angle of 60° and an azimuth of 0 to 360° is preferably 6 or less and more preferably 2 or less. A maximum value of a* at a polar angle of 60° and an azimuth of 0 to 360° is preferably 11 or less and more preferably 7 or less. Here, A above a* is a chromatic coordinate in CIE1976L*a*b* color space. The above a* shows a magnitude of a red color on the screen and in an ideal state where no colored image is observed, a*=0.

The liquid crystal display device of the present invention is characterized by a small color shift even if the screen is viewed from any direction at an angle range of 360° when, for example, the screen displaying a black image is viewed from an oblique direction. In the case of the above liquid crystal display device, a difference between the maximum value and minimum value of $\Delta a^*b^*[=\{(a^*)^2+(b^*)^2\}^{1/2}]$ at a polar angle of 60° and an azimuth of 0 to 360° is preferably 9 or less and more preferably 5 or less. The maximum value of $\Delta a^*b^*$ at a polar angle of 60° and an azimuth of 0 to 360° is preferably 11 or less and more preferably 7 or less. Here, the above a* and b* are chromatic coordinates a* and b* defined by CIE1976L*a*b* color space. The above $\Delta a^*b^*$ shows the magnitude of the coloring on the screen and in an ideal state where no colored image is observed, $\Delta a^*b^*=0$.

[H. Application]

The liquid crystal display device of the present invention is used for optional appropriate uses. Examples of the uses include office automation equipments such as a personal computer monitor, a notebook computer and a copying machine, portable equipments such as a portable telephone, a watch, a digital camera, a personal digital assistant (PDA) and a portable game machine, domestic electrical equipments such as a video camera, a television set and a microwave oven, on-vehicle equipments such as a back monitor, a monitor for a car navigation system and a car audio, display equipments such as an information monitor for a commercial store, security equipments such as an observation monitor, and care/medical equipments such as a care monitor and a medical monitor.

The uses of the liquid crystal display device of the present invention are preferably a television set. The screen size of the above-mentioned television set is preferably wide 17 type (373 mm×224 mm) or more, more preferably wide 23 type (499 mm×300 mm) or more and particularly preferably wide 32 type (687 mm×412 mm) or more.

EXAMPLES

The present invention will be further described bellow by way of Examples and Comparative Examples mentioned above. The present invention is not limited to Examples. Each analysis method used in Examples is as follows.

(1) Measurement of Single Transmittance of Polarizer:

Using a spectrophotometer (trade name: "DOT-3", manufactured by Murakami Color Research Laboratory), Y value corrected by a luminosity factor was measured by the 2-degree visual field (C light source) of JIS Z 8701-1982.

(2) Measurement of Degree of Polarization of Polarizer:

Using a spectrophotometer (trade name: "DOT-3", manufactured by Murakami Color Research Laboratory), the parallel transmittance ($H_0$) and orthogonal transmittance ($H_{90}$) of a polarizer were measured to find the degree of polarization from the equation: Degree of polarization (%)=$\{(H_0-H_{90})/(H_0+H_{90})\}^{1/2}\times 100$. The above parallel transmittance ($H_0$) is a value of the transmittance of a parallel type laminate polarizer produced by overlapping two polarizers of the same types on each other such that the absorption axes of these polarizers are parallel to each other. Also, the above orthogonal transmittance ($H_{90}$) is a value of the transmittance of an orthogonal type laminate polarizer produced by overlapping two polarizers of the same types on each other such that the absorption axes of these polarizers are perpendicular to each other. These transmittances are Y values which are corrected by a luminosity factor and measured by the 2-degree visual field (C light source) of JIS Z 8701-1982.

(3) Method of Measuring Retardation Values (Re[$\lambda$], Rth[$\lambda$]), Nz Coefficient and T[590]:

These values were measured using a device (trade name: KOBRA21-ADH), manufactured by Oji Scientific Instruments, at 23° C. It is to be noted that as the average refractive index, a value measured by using Abbe refractometer (trade name: "DR-M4", manufactured by Atago Co., Ltd.,) was used.

(4) Method of Measuring Thickness:

When the thickness was less than 10 μm, it was measured by spectrophotometer for a thin film (trade name: "Multi Channel Photo Detector MCPD-2000", manufactured by Otsuka Electronics Co., Ltd.). When the thickness was 10 μm or more, it was measured by using a digital micrometer (trade name: "KC-351C Model", manufactured by Anritsu Corporation).

(5) Method of Measuring Molecular Weight of Polyimide

A molecular weight of polyimide was calculated by using polyethylene oxide as a standard sample according to a gel permeation chromatograph (GPC) method. Apparatuses, instruments and measuring conditions are as follows.

Sample: A sample was dissolved in an eluate to prepare a 0.1 wt % solution.

Pretreatment: After the solution was allowed to stand for 8 hours, it was subjected to filtration using 0.45 μm membrane filter.

Analyzer: "HCL-8020GPC", manufactured by Tosoh Corporation

Column: $GMH_{XL}+GMH_{XL}+G2500H_{XL}$, manufactured by Tosoh Corporation

Column size: 7.8 mmφ×30 cm (each) (total 90 cm)

Eluent: Dimethylformamide (1 L of a dimethylformamide solution obtained by adding 10 mM lithium bromide and 10 mM of phosphoric acid to adjust its volume).

Flow rate: 0.8 ml/min.

Detector: RI (differential refractometer)

Column temperature: 40° C.

Injection volume: 100 μl (6) Method of Measuring Absolute Value (C[590]) of Photoelasticity Coefficient:

Using a spectral elipsometer (trade name: "M-220", manufactured by JASCO Corporation), a retardation value (23° C./wavelength of 590 nm) of the center of the sample (size: 2 cm×10 cm) was measured, while both ends of the sample were clipped and a stress (5 to 15 N) was applied to the sample, to calculate a photoelasticity coefficient from the inclination of a curve showing the retardation value as a function of the stress.

(7) Method of Measuring Water Absorbance

Measurement was made according to the method A of JIS K 7209-1984 "Test method of the water absorbance and boiled water absorbance of plastics" to find the water absorbance from the ratio [$\{(M_2-M_1)/M_1\}\times 100$]. $M_1$ is the weight of a test piece after the condition of the test piece was adjusted. $M_2$ is the weight of the test piece after the test piece was made to absorb water. The test piece was formed into a size of 5 cm×5 cm.

(8) Method of Measuring Moisture Permeability

A moisture permeability of a test piece was measured according to JIS Z 0208-1976 "Test method of moisture permeability of moisture-proof package materials". As the sample, a circular film sheet having a 70 to 80 mmφ and a thickness of 3 mm or less was used. In the moisture permeability test, a thermohygrostat kept at 40±0.5° C. under a relative humidity of 90±2% was used.

(9) Method of Measuring Glass Transition Temperature (Tg):

This was measured using a differential scanning calorimeter (trade name: "DSC-6200", manufactured by Seiko Instruments Inc.) by a method according to JIS K 7121 (1987) (Method of measuring a transition temperature of plastics). Specifically, 3 mg of a sample was heated (heating speed: 10° C./min) in a nitrogen atmosphere (flow rate of gas: 80 ml/min) to raise the temperature of the sample, thereby measuring the temperature twice, to adopt the second data. The temperature of the calorimeter was calibrated using a standard material (indium).

(10) Method of Measuring Contrast Ratio

A back-light was turned on in a 23° C. dark room and after 30 minutes passed, the Y value in the XYZ display system in the case of displaying a white image and a black image was measured by using a device (trade name: "EZ Contrast 160D", manufactured by ELDIM Corporation). A contrast ratio "YW/YB" in an oblique direction was calculated from the Y value (YW) in the white image and the Y value (YB) in the black image. In this case, the longitudinal side direction of the liquid crystal panel had an azimuth of 0° and the direction of the normal line had a polar angle of 0°.

(11) Method of Measuring Coloring (a*) and Color Shift Amount (Δa*b*) in Liquid Crystal Display Light was turned on in a 23° C. dark room and after 30 minutes passed, chromatic coordinates a*, b* which were defined by CIE1976L*a*b* color space at a polar angle of 60° and an azimuth of 0 to 360° on the screen displaying a black image was measured by using a device (trade name: "EZ Contrast 160D", manufactured by ELDIM Corporation). The color shift amount (Δa*b*) in an oblique direction was calculated from the equation:

$$\{(a^*)^2+(b^*)^2\}^{1/2}.$$

Preparation of Polarizer

Reference Example 1

A commercially available polarizing plate (trade name: "NPF SIG1423DU", manufactured by Nitto Denko Corporation) was used as a polarizing plate A as it was. This polarizing plate A included a polarizer and protective layers disposed on both sides of the polarizer. The single transmittance of the above polarizer was 43% and the degree of polarization was 99%. The above two protective layers of the polarizing plate A each had the properties that the index ellipsoid showed the relation: nx=ny=nz, Re[590]=0.5 nm and Rth[590] was 1 nm.

Reference Example 2

A commercially available polarizing plate (trade name: "NPF SEG1423DU", manufactured by Nitto Denko Corp.) was used as a polarizing plate B as it was. This polarizing plate B included a polarizer and protective layers disposed on both sides of the polarizer. The single transmittance of the above polarizer was 43% and the degree of polarization was 99%. The above two protective layers of the polarizing plate B each had the properties that the index ellipsoid showed the relation: nx=ny>nz, Re[590]=0.5 nm and Rth[590] was 60 nm.

Preparation of Liquid Crystal Cell

Reference Example 3

A liquid crystal panel was taken out of a commercially available liquid crystal display device (trade name: "BRAVIA KDL-40X1000", manufactured by Sony Corporation, 40 inch liquid crystal television) containing a VA mode liquid crystal cell. All optical films such as polarizing plate disposed on the front and back sides of the liquid crystal cell were removed. The front and back sides of the glass plate of the obtained liquid crystal cell were cleaned to obtain a liquid crystal cell A.

Synthesis of Polyvinylacetal Type Polymer

Reference Example 4

8.8 g of a vinyl alcohol type polymer (trade name: "NH-18", manufactured by The Nippon Synthetic Chemical Industries, Co., Ltd. (the degree of polymerization: 1800, the degree of saponification: 99.0%)) was dried at 105° C. by an air circulation system drying oven for 2 hours and then dissolved in 167.2 g of dimethylsulfoxide. 11.8 g of 2-methoxy-1-naphthoaldehyde, 10.6 g of benzaldehyde and 0.80 g of p-toluenesulfonic acid monohydrate were added to the solution, which was then stirred at 40° C. for one hour. 23.64 g of 1,1-diethoxyethane (acetal) was further added to the reaction solution, which was stirred at 40° C. for one hour. Thereafter, 2.13 g of triethylamine was added to the reaction solution to finish the reaction. The obtained crude product was reprecipitated by 1 L of methanol. The filtered polymer was dissolved in tetrahydrofuran and reprecipitated again by methanol. The obtained precipitate was collected by filtration and dried to obtain 11.5 g of a white polymer. This polymer was measured by $^1$H-NMR, to find that it was a vinylacetal type polymer having a repeat unit represented by the following structural formula (V). The glass transition temperature of this vinylacetal type polymer was 131° C.

[Formula 7]

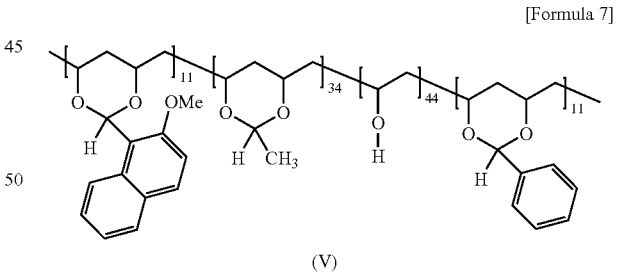

(V)

Synthesis of an Imide Type Polymer

Reference Example 5

A reaction container (500 mL) equipped with a mechanical type stirrer, a deanstark device, a nitrogen-introducing tube, a thermometer, and a condenser tube was charged with 17.77 g (40 mmol) of 2,2'-bis(3,4-dicarboxyphenyl)hexafluoropropanoic acid dihydride (manufactured by Clariant (Japan) K.K.) and 12.81 g (40 mmol) of 2,2-bis(trifluoromethyl)-4, 4'-diaminobiphenyl (manufactured by Wakayama Seika Kogyo Co., Ltd.). Subsequently, a solution prepared by dissolving 2.58 g (20 mmol) of isoquinoline in 275.21 g of m-cresol was added to the mixture, which was then stirred (600 rpm) at 23° C. for one hour to obtain a uniform solution. Next, the reaction container was heated using an oil bath to raise the temperature of the solution in the container to 180±3° C. and the solution was stirred with keeping the temperature for 5 hours to obtain a yellow solution. After the solution was further stirred for 3 hours, heating and stirring were stopped and the solution was allowed to cool to ambient temperature and then a polymer precipitated in a gel-like form.

Acetone was added to the yellow solution in the reaction container and the above gel was completely dissolved to prepare a dilute solution (7% by weight). After this dilute solution was added little by little to 2 L of isopropyl alcohol with stirring, a white powder was precipitated. This powder was collected by filtration and poured into 1.5 L of isopropyl alcohol to wash the powder. The same procedures were repeated once to wash the powder and then, the powder was collected again by filtration. The powder was dried in a 60° C. air circulating system constant-temperature oven for 48 hours and then dried at 150° C. for 7 hours to obtain a polyimide powder having the following structural formula (VI) (yield: 85%). The polymerization average molecular weight (Mw) of the above polyimide was 124,000 and an imidization ratio was 99.9%.

[Formula 8]

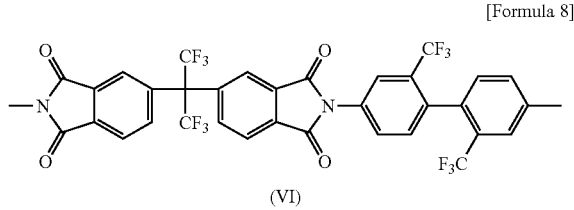

(VI)

Production of Retardation Film (A)

Reference Example 6

The vinylacetal type polymer (25 parts by weight) produced in Reference Example 4 was dissolved in methyl ethyl ketone (100 parts by weight) to prepare a 20% solution. This solution was uniformly cast sheet-wise on the surface of a 75-μm-thick polyethylene terephthalate film (trade name: "Lumirror S27-E", manufactured by Toray Industries, Inc.) by a comma coater. The film coated with the solution was heated to raise the temperature of the surface gradually from a low temperature in such a manner that it was kept at 80° C. for 20 minutes, at 120° C. for 20 minutes and at 150° C. for 60 minutes in a multi-chamber type air circulating system drying oven (error: ±1° C.), to evaporate solvents. The above polyethylene terephthalate film was peeled off to manufacture a 120-μm-thick polymer film (A-1). The transmittance of and the amount of residual volatile components in the polymer film (A-1) were 90% and 5% respectively. The above polymer film (A-1) was drawn 1.7 times at 135° C.±1° C. by using a dry-heating system biaxial drawing device according to an end-fixed lateral monoaxial drawing method. The retardation film (A-1) obtained in this manner is shown in Table 1.

TABLE 1

| | Retardation film | |
|---|---|---|
| | A1 | A2 |
| Index ellipsoid | nx > ny = nz | nx > ny > nz |
| Thickness (μm) | 58 | 62 |
| Absolute value of photoelasticity coefficient ×10$^{-12}$ (N/m$^2$) | 24 | 24 |
| Water absorbance (%) | 5 | 5 |
| Moisture permeability (g/cm$^2$) | 113 | 113 |
| T[590] (%) | 92 | 92 |
| Re[450] (nm) | 112 | 70 |
| Re[550] (nm) | 118 | 74 |
| Re[590] (nm) | 120 | 75 |
| Re[750] (nm) | 125 | 78 |
| An$_{xy}$[590] | 0.0021 | 0.0012 |
| Rth[590] (nm) | 129 | 86 |
| Nz coefficient | 1.08 | 1.15 |
| Re[750]−Re[550] (nm) | 13 | 8 |
| D$_A$(Re[750]/Re[550]) | 1.056 | 1.504 |

Reference Example 7

A polymer film (A-1) manufactured in the same method as in Reference Example 6 was drawn 1.7 times at 140° C.±1° C. by using a dry-heating system biaxial drawing device according to an end-fixed lateral biaxial drawing method. A retardation film (A-2) obtained in this manner is shown in Table 1.

Production of Retardation Film (B)

Reference Example 8

The polyimide powder produced in Reference Example 5 was dissolved in methyl isobutyl ketone to prepare a 15% by weight polyimide solution. This solution was uniformly cast sheet-wise on the surface of a 75-μm-thick polyethylene terephthalate film (trade name: "Lumirror S27-E", manufactured by Toray Industries, Inc.) by a comma coater. The film coated with the solution was heated to raise the temperature of the surface gradually from a low temperature in such a manner that it was kept at 80° C. for 2 minutes, at 135° C. for 5 minutes and at 150° C. for 10 minutes in a multi-chamber type air circulating system drying oven (error: ±1° C.), to evaporate solvents. The above polyethylene terephthalate film was peeled off to manufacture a 3-μm-thick polyimide layer (retardation film (B)). The above retardation film (B) had the properties that the index ellipsoid showed the relation: nx=ny>nz, T[590]=91%, Re[590]=1 nm, Rth[590]=120 nm and D$_B$(R40[750]/R40[550])=0.936.

Production of Liquid Crystal Panel and Liquid Crystal Display Device

Example 1

The retardation film (A-1) obtained in Reference Example 6 was applied to the surface of the visual side of the liquid crystal cell A prepared in Reference Example 3 through an acryl type pressure sensitive adhesive layer (20 μm) such that the phase delay axis of the above retardation film (A-1) was substantially perpendicular to the longer side direction of the above liquid crystal cell A. Then, the polarizing plate A obtained in Reference Example 1 was applied to the surface of the visual side of the above retardation film (A-1) through an acryl type pressure sensitive adhesive layer (20 μm) such that the absorption axis direction of the above polarizing plate A was substantially parallel to the longer side direction of the above liquid crystal cell A. At this time, the absorption axis direction of the above polarizing plate A is substantially perpendicular to the phase delay axis direction of the above retardation film (A-1).

Figure 7:
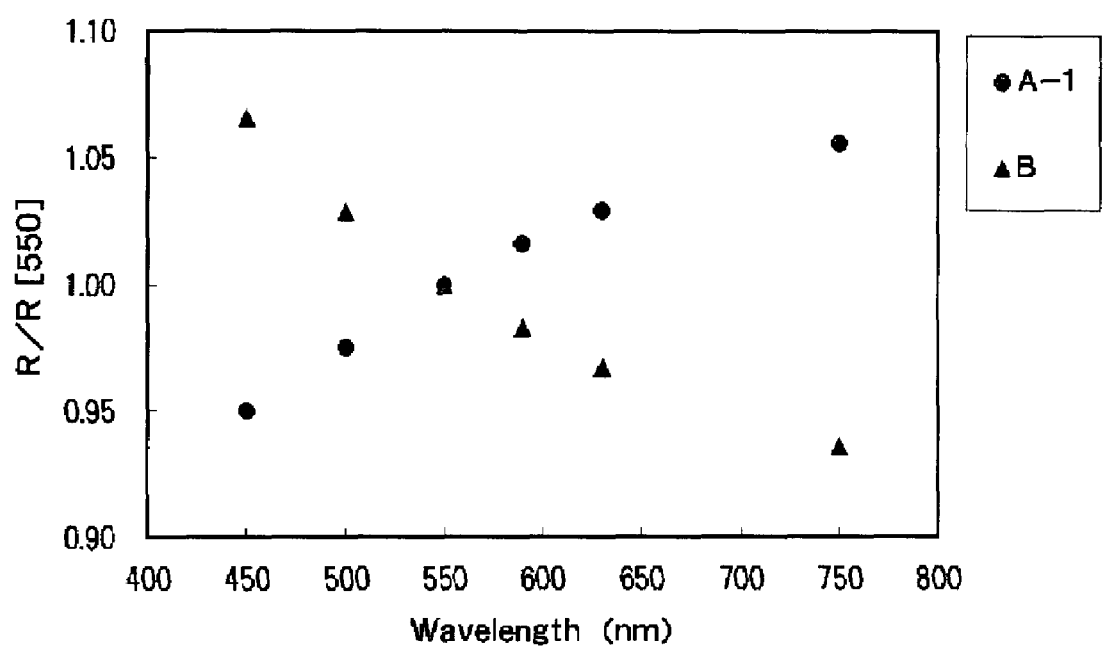
FIG. 7 is a graph showing each wavelength dispersion property of a retardation film (A-1) and a retardation film (B) which are used in a liquid crystal panel of Example 1.

Subsequently, the retardation film (B) obtained in Reference Example 7 was applied to the back-light side surface of the above liquid crystal cell A through an acryl type pressure sensitive adhesive layer (20 μm). The polarizing plate B obtained in Reference Example 2 was applied to the back-light side surface of the above retardation film (B) through an acryl type pressure sensitive adhesive layer (20 μm) such that the absorption axis direction of the above polarizing plate B was substantially perpendicular to the longer side direction of the above liquid crystal cell A. At this time, the absorption axis direction of the above polarizing plate A was substantially perpendicular to the absorption axis direction of the above polarizing plate B. FIG. 7 shows the wavelength dispersion properties of the retardation film (A-1) and retardation film (B) used in the liquid crystal panel of Example 1. The ordinate of the graph in FIG. 7 is Re/Re[550] for the plots of the retardation film (A-1) and R40/R40[550] for the plots of the retardation film (B). A difference $\Delta D$ ($D_A - D_B$) of the above liquid crystal panel A is 0.12.

Figure 8:
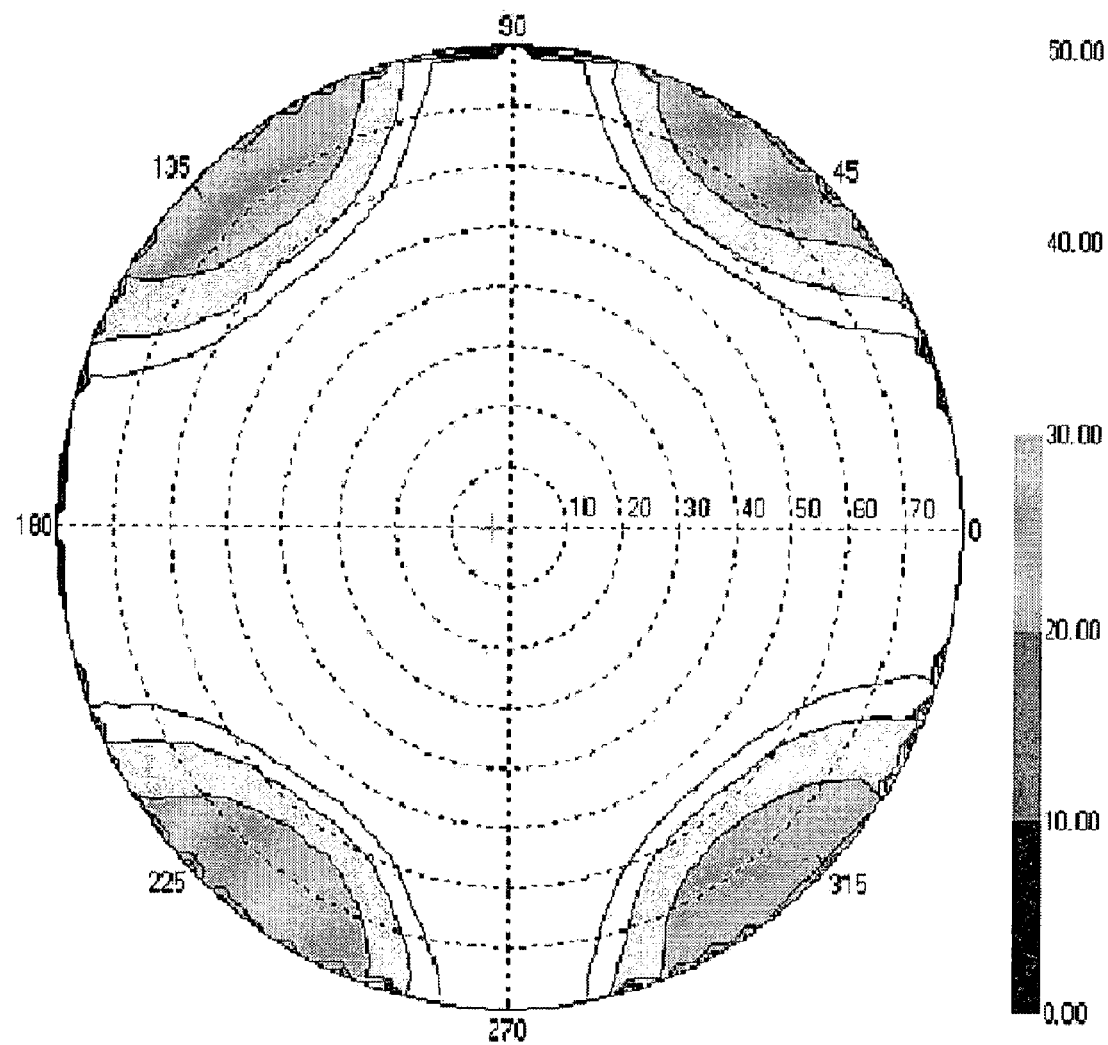
FIG. 8 is a contrast contour line diagram of a liquid crystal display device of Example 1.

This liquid crystal panel A was united with the back-light unit of the original liquid crystal display device to manufacture a liquid crystal display device A. FIG. 8 is a contour map of the contrast of the liquid crystal display device of Example 1. As shown in FIG. 8, any characteristic region where the contrast was 10 or less in all azimuths was not observed in this liquid crystal display device A. Therefore, the viewing angles of the above liquid crystal display device A in the vertical direction and lateral direction are all 160° or more.

The above liquid crystal display device A had the following characteristics that:

the average of contrast ratios at a polar angle of 60° and an azimuth of 0 to 360° was 81.5;

the minimum value of contrast ratios at a polar angle of 60° and an azimuth of 0 to 360° was 24.9;

the average of a* at a polar angle of 60° and an azimuth of 0 to 360° was 1.00;

the maximum value of a* at a polar angle of 60° and an azimuth of 0 to 360° was 5.60;

a difference between the maximum value and minimum value of Δa*b* at a polar angle of 60° and an azimuth of 0 to 360° was 3.77; and the maximum value of Δa*b* at a polar angle of 60° and an azimuth of 0 to 360° was 8.59.

Example 2

A liquid crystal panel B and a liquid crystal display device B were manufactured in the same manner as in Example 1 except that the retardation film (A-2) was used in place of the retardation film (A-1) and a polarizing plate B was used in place of the polarizing plate A. A difference $\Delta D$ ($D_A - D_B$) in the above liquid crystal panel B is 0.116. Any characteristic region where the contrast was 10 or less in all azimuths was not also observed in this liquid crystal display device B. Therefore, the angles of view of the above liquid crystal display device B in the vertical direction and lateral direction are all 160° or more.

The above liquid crystal display device B had the following characteristics that:

the average of contrast ratios at a polar angle of 60° and an azimuth of 0 to 360° was 79.9;

the minimum value of contrast ratios at a polar angle of 60° and an azimuth of 0 to 360° was 34.1;

the average of a* at a polar angle of 60° and an azimuth of 0 to 360° was 5.38;

the maximum value of a* at a polar angle of 60° and an azimuth of 0 to 360° was 10.51;

a difference between the maximum value and minimum value of Δa*b* at a polar angle of 60° and an azimuth of 0 to 360° was 7.03; and the maximum value of Δa*b* at a polar angle of 60° and an azimuth of 0 to 360° was 10.59.

Comparative Reference Example 1

A commercially available liquid crystal display device (trade name: "BRAVIA KDL-40X1000", manufactured by Sony Corporation, 40 inch liquid crystal television) containing a VA mode liquid crystal cell was used as it was as a liquid crystal display device X.

The above liquid crystal display device X had the following characteristics that:

the average of a* at a polar angle of 60° and an azimuth of 0 to 360° was 6.67;

the maximum value of a* at a polar angle of 60° and an azimuth of 0 to 360° was 11.84;

a difference between the maximum value and minimum value of Δa*b* at a polar angle of 60° and an azimuth of 0 to 360° was 9.31; and the maximum value of Δa*b* at a polar angle of 60° and an azimuth of 0 to 360° was 11.85.

(Evaluation)

Figure 9:
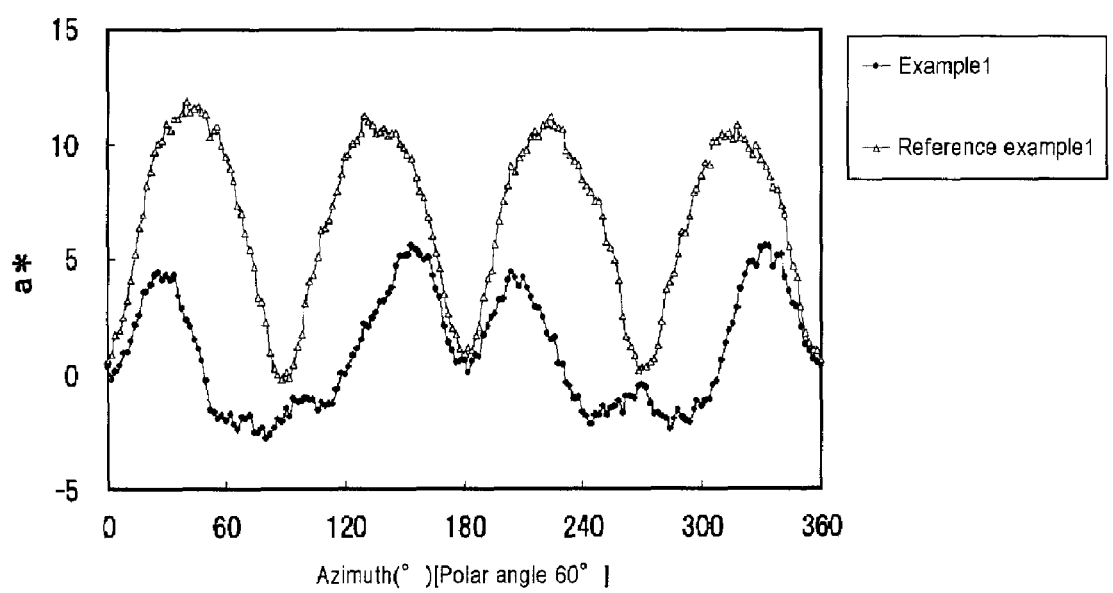
FIG. 9 is a graph showing a variation in coloring (a*) at a polar angle of 60° and an azimuth of 0 to 360° on a screen displaying a black image in each liquid crystal display device of Example 1 and Comparative Reference Example 1.
Figure 10:
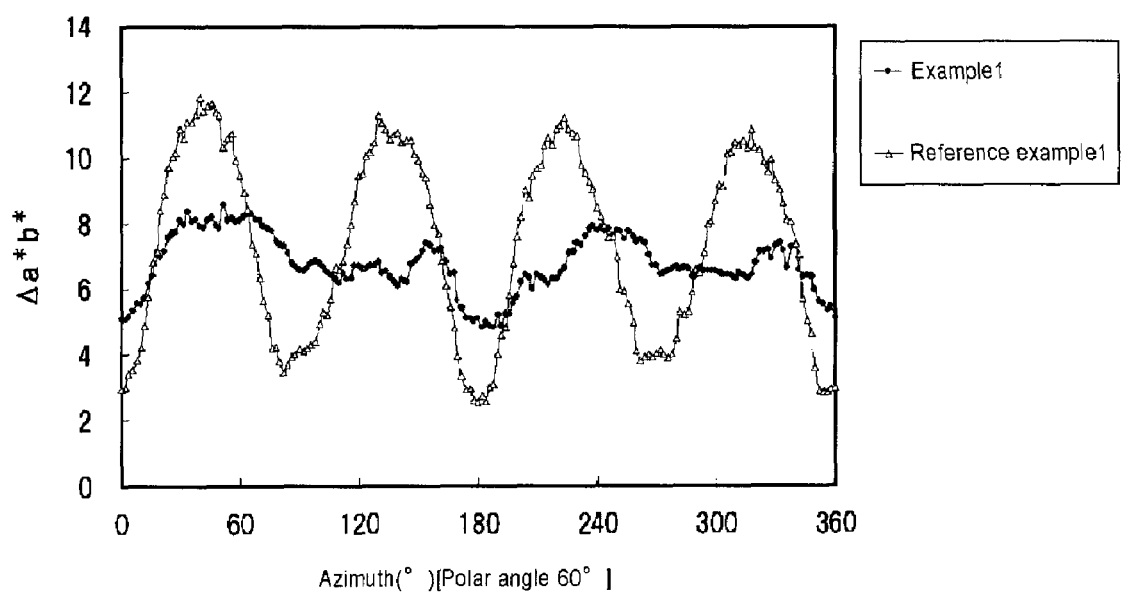
FIG. 10 is a graph showing a variation in a color shift amount ($\Delta a^*b^*$) at a polar angle of 60° and an azimuth of 0 to 360° on the screen displaying a black image in each liquid crystal display device of Example 1 and Comparative Reference Example 1.

FIG. 9 shows a variation in coloring (a*) on the screen displaying a black image in the liquid crystal display devices of Example 1 and Comparative Reference Example 1 at a polar angle of 60° and an azimuth of 0 to 360°. FIG. 10 shows a variation in a color shift amount (Δa*b*) on the screen displaying a black image in the liquid crystal display devices of Example 1 and Comparative Reference Example 1 at a polar angle of 60° and an azimuth of 0 to 360°. As shown in FIGS. 9 and 10, it is understood that the liquid crystal display device of Example 1 is more outstandingly decreased in the variation in a* and Δa*b* as a function of an azimuth and is more greatly reduced in coloring and a color shift even if the image is viewed from any direction at an angle range of 360° than the liquid crystal display device of Comparative Reference Example 1.

INDUSTRIAL APPLICABILITY

As mentioned above, the liquid crystal panel of the present invention exhibits excellent display properties and is therefore preferably used for liquid crystal televisions, portable telephones and the like.

The invention claimed is:

1. A liquid crystal panel comprising at least a liquid crystal cell, a first polarizer disposed on one side of the liquid crystal cell, a second polarizer disposed on the other side of the liquid crystal cell and a retardation film (A) disposed between the liquid crystal cell and the first polarizer, wherein;

the retardation film (A) contains a thermoplastic polymer having at least a substituent (a) represented by the following formula (I) and an in-plane retardation value (Re[750]) at a wavelength of 750 nm is larger than an in-plane retardation value (Re[550]) at a wavelength of 550 nm:

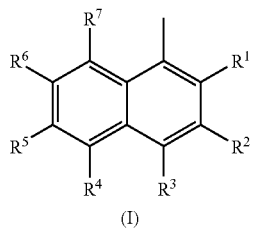

[Formula 1]

wherein $R^1$ to $R^7$ each independently represent a hydrogen atom, a halogen atom, a straight-chain or branched alkyl group having 1 to 4 carbon atoms, a straight-chain or branched alkyl halide group having 1 to 4 carbon atoms, a straight-chain or branched alkoxy group having 1 to 4 carbon atoms, a straight-chain or branched thioalkoxy group having 1 to 4 carbon atoms, a straight-chain or branched alkoxycarbonyl group, an acyloxy group, an amino group, an azide group, a nitro group, a cyano group, a hydroxy group or a thiol group (provided that $R^1$ is not a hydrogen atom);

wherein an absolute value of a photoelasticity coefficient of said retardation film (A) is $50 \times 10^{-12}$ (m²/N) or less.

2. The liquid crystal panel according to claim 1, wherein said liquid crystal cell contains a liquid crystal molecule oriented in a homeotropic arrangement.

3. The liquid crystal panel according to claim 1, wherein a phase delay axis direction of said retardation film (A) is substantially perpendicular to a absorption axis direction of said first polarizer.

4. The liquid crystal panel according to claim 1, wherein said thermoplastic polymer is a vinyl acetal type polymer, an olefin type polymer or a carbonate type polymer.

5. The liquid crystal panel according to claim 1, wherein a difference ($\Delta Re_{750-550} = Re[750] - Re[550]$) between the in-plane retardation value (Re[750]) of the retardation film (A) at a wavelength of 750 nm and the in-plane retardation value (Re[550]) of the film at a wavelength of 550 nm is 3 nm or more.

6. The liquid crystal panel according to claim 1, wherein an in-plane birefringence index ($\Delta n_{xy}[590]$) of said retardation film (A) at a wavelength of 590 nm is 0.001 or more.

7. The liquid crystal panel according to claim 1, wherein an index ellipsoid of said retardation film (A) shows the relation: nx>ny=nz or the relation: nx>ny>nz.

8. The liquid crystal panel according to claim 1, further comprising a retardation film (B) whose index ellipsoid shows the relation: nx=ny>nz between said retardation film (A) and said second polarizer.

9. The liquid crystal panel according to claim 8, wherein said retardation film (B) contains at least one type of polymer selected from the group consisting of a cellulose type polymer, an amideimide type polymer, an imide type polymer, an amide type polymer, an ether ether ketone type polymer and a cycloolefin type polymer.

10. The liquid crystal panel according to claim 8, wherein a difference ($D_A - D_B$) between a wavelength dispersion value ($D_A$) of said retardation film (A) and a wavelength dispersion value ($D_B$) of said retardation film (B) is 0.05 or more, wherein;

the wavelength dispersion value ($D_A$) is a value calculated from an equation: Re[750]/Re[550] where Re[750] and Re[550] are in-plane retardation values at wavelengths of 750 and 550 nm respectively and the wavelength dispersion value ($D_B$) is a value calculated from an equation: R40[750]/R40[550] where R40[750] and R40[550] are retardation values, measured when the film is inclined at an angle of 40° with respect to a normal line, at wavelengths of 750 and 550 nm respectively.

11. A liquid crystal display device comprising the liquid crystal panel according to claim 1.

* * * * *